(12) United States Patent
Strohecker et al.

(10) Patent No.: US 12,220,868 B2
(45) Date of Patent: Feb. 11, 2025

(54) SYSTEMS AND METHODS FOR THREE-DIMENSIONAL PRINTING

(71) Applicant: LUXCREO (BEIJING) INC., Beijing (CN)

(72) Inventors: Michael Robert Strohecker, Palo Alto, CA (US); Mike Shang-Yu Yang, Palo Alto, CA (US); Meng-Han Liu, Beijing (CN); Yi-Ho Lin, Beijing (CN); Guang Zhu, Ningbo (CN)

(73) Assignee: LUXCREO (BEIJING) INC., Beijing (CN)

( * ) Notice: Subject to any disclaimer, the term of this patent is extended or adjusted under 35 U.S.C. 154(b) by 321 days.

(21) Appl. No.: 17/644,333

(22) Filed: Dec. 14, 2021

(65) Prior Publication Data

US 2022/0105681 A1 Apr. 7, 2022

Related U.S. Application Data

(63) Continuation of application No. PCT/CN2020/095964, filed on Jun. 12, 2020.

(51) Int. Cl.
*B29C 64/277* (2017.01)
*B29C 64/129* (2017.01)
(Continued)

(52) U.S. Cl.
CPC .......... *B29C 64/277* (2017.08); *B29C 64/129* (2017.08); *B33Y 10/00* (2014.12);
(Continued)

(58) Field of Classification Search
CPC ... B29C 64/277; B29C 64/129; B29C 64/393; B33Y 30/00; B33Y 50/02
See application file for complete search history.

(56) References Cited

U.S. PATENT DOCUMENTS

2015/0140152 A1  5/2015 Chen
2016/0067921 A1  3/2016 Willis et al.
(Continued)

FOREIGN PATENT DOCUMENTS

CN  107443731 A  12/2017
CN  109760300 A   5/2019
(Continued)

OTHER PUBLICATIONS

International Search Report in PCT/CN2020/095964 mailed on Sep. 16, 2020, 5 pages.
(Continued)

*Primary Examiner* — Jeffrey M Wollschlager
*Assistant Examiner* — Xue H Liu
(74) *Attorney, Agent, or Firm* — Metis IP LLC

(57) ABSTRACT

A method and system for photopolymerization 3D printing is provided. The system includes a processing device, a micro light emitting diode (microLED) array including one or more individually addressable microLED emitters, and a printing component. The processing device is configured to determine one or more printing layers of an object. The microLED array is configured to generate light for each of the one or more printing layers. The printing component is configured to print the one or more printing layers. To generate the light for each of the one or more printing layers, the processing device is further configured to dynamically determine one or more microLED regions in the microLED array, determine one or more region printing parameters for each of the one or more microLED regions; and determine one or more control signals for the one or more individually addressable microLED emitters included in each of the one or more microLED regions based on the one or more region printing parameters.

18 Claims, 16 Drawing Sheets

(51) Int. Cl.
*B33Y 10/00* (2015.01)
*B33Y 30/00* (2015.01)
*B29C 64/393* (2017.01)
*B33Y 50/02* (2015.01)

(52) U.S. Cl.
CPC ............ *B33Y 30/00* (2014.12); *B29C 64/393* (2017.08); *B33Y 50/02* (2014.12)

(56) References Cited

U.S. PATENT DOCUMENTS

| | | |
|---|---|---|
| 2016/0332380 A1 | 11/2016 | De Pena et al. |
| 2017/0100885 A1 | 4/2017 | Desimone et al. |
| 2018/0264724 A1 | 9/2018 | Feller et al. |
| 2019/0229002 A1 | 7/2019 | Ge et al. |

FOREIGN PATENT DOCUMENTS

| | | | | |
|---|---|---|---|---|
| CN | 110712370 A | 1/2020 | | |
| KR | 101990431 B1 | 6/2019 | | |
| WO | 2017192033 A2 | 11/2017 | | |
| WO | 2018140218 A1 | 8/2018 | | |
| WO | 2019175729 A1 | 9/2019 | | |
| WO | WO-2019222094 A1 * | 11/2019 | ........... | B29C 64/129 |
| WO | 2022003661 A1 | 1/2022 | | |

OTHER PUBLICATIONS

Written Opinion in PCT/CN2020/095964 mailed on Sep. 16, 2020, 5 pages.
Decision to Grant a Patent in Japanese Application No. 2021575008 mailed on Apr. 3, 2023, 5 pages.

* cited by examiner

SYSTEMS AND METHODS FOR THREE-DIMENSIONAL PRINTING

CROSS-REFERENCE TO RELATED APPLICATION

This application is a continuation of International Application No. PCT/CN2020/095964, filed on Jun. 12, 2020, designating the United States of America, which claims priority to U.S. Provisional Application No. 62/862,440, filed on Jun. 17, 2019, the contents of which are hereby incorporated by reference.

TECHNICAL FIELD

The present disclosure relates to three-dimensional (3D) printing, and more particularly, relates to systems and methods for printing a 3D object based on light emitted from a light irradiating device including a micro light emitting diode (microLED) array.

BACKGROUND

One class of 3D printers may be based on various types of photopolymerization. In these printers, the three-dimensional part may be built up one layer at a time. Each layer may be formed by projecting a two-dimensional pattern for that layer into a photopolymerizable liquid, thus curing the liquid to form a solid shape that matches the two-dimensional pattern. The pattern typically may be displayed on a display device, such as those based on LCD (liquid crystal display) or DLP (digital light processing, which is based on digital micromirror devices) technologies. The pattern may be projected by optics from the display device onto the liquid. Light of the display device may affect the properties and/or characteristics (e.g., precision, size) of a final printed object. It is desirable to provide systems and methods for providing an optimized light emitting mechanism, with longer service life, stronger intensity light, and larger size display, for satisfying various applications of 3D printing.

SUMMARY

In a first aspect of the present disclosure, a photopolymerization 3D printing system is provided. The system may include a processing device, a micro light emitting diode (microLED) array, and a printing component. The processing device may be configured to determine one or more printing layers of an object. The microLED array may be configured to generate light for each of the one or more printing layers. To generate the light for each of the one or more printing layers, the processing device may further be configured to dynamically determine one or more microLED regions in the microLED array, each of the one or more microLED regions including one or more individually addressable microLED emitters; determine one or more region printing parameters for each of the one or more microLED regions; and determine one or more control signals for the one or more individually addressable microLED emitters included in each of the one or more microLED regions based on the one or more region printing parameters. The printing component may be configured to print the one or more printing layers.

In some embodiments, a pixel pitch of the microLED array may be smaller than 50 μm.

In some embodiments, the microLED array may be arranged on one or more microLED sub-panels, and the one or more microLED sub-panels may be rotatable with respect to each other.

In some embodiments, each of the one or more microLED regions may be corresponding to one or more microLED sub-panels.

In some embodiments, position of at least one of the one or more individually addressable microLED emitter may be adjustable.

In some embodiments, the one or more microLED regions determined for different printing layers may be the same.

In some embodiments, to dynamically determine one or more microLED regions in the microLED array, the processing device may be configured to determine a first microLED region for a first printing layer; and determine a second microLED region for a second printing layer, wherein the first microLED region may be different from the second microLED region.

In some embodiments, different printing layers may have different counts of microLED regions.

In some embodiments, a third microLED region may be determined for both of a third printing layer and a fourth printing layer. The third microLED region may generate first light with a first wavelength for the third printing layer; the third microLED region may generate second light with a second wavelength for the fourth printing layer; and the first wavelength may be different from the second wavelength.

In some embodiments, a fourth microLED region may be determined for a fifth printing layer and a fifth microLED region may be determined for a sixth printing layer. The fourth microLED region may output a first printing resolution for the fifth printing layer; the fifth microLED region may output a second printing resolution for the sixth printing layer; and the first printing resolution may be different from the second printing resolution.

In some embodiments, a sixth microLED region may be determined for a seventh printing layer and a seventh microLED region may be determined for an eighth printing layer. The sixth microLED region may output a first intensity of light for the seventh printing layer; the seventh microLED region may output a second intensity of light for the eighth printing layer; and the first intensity may be different from the second intensity.

In some embodiments, the one or more microLED regions may include different microLED regions, and the different microLED regions may have different counts of microLED emitters.

In some embodiments, the one or more microLED regions may include different microLED regions, and the different microLED regions may have a same count of microLED emitters.

In some embodiments, the region printing parameters for different microLED regions may be different.

In some embodiments, the one or more control signals may be configured to control at least one of a display status, an exposure time, a wavelength, or a modulation mode of the one or more individually addressable microLED emitters included in each of the one or more microLED regions.

In some embodiments, the modulation mode may include a Pulse Width Modulation (PWM) or a Pulse Frequency Modulation (PFM).

In some embodiments, the one or more individually addressable microLED emitters may include at least one of a red microLED emitter, a blue microLED emitter, a green microLED emitter, or an ultraviolet microLED emitter.

In some embodiments, the system may further include an optical element for collimating a light beam produced by the one or more microLED regions.

In a second aspect of the present disclosure, a method is provided. The method may be implemented on at least one machine each of which has at least one processor and at least one storage device. The method may include one or more of the following operations. One or more printing layers of an object may be determined. For each of the one or more printing layers, one or more microLED regions in a microLED array may be dynamically determiend, each of the one or more microLED regions may include one or more individually addressable microLED emitters; one or more region printing parameters for each of the one or more microLED regions may be determined; and one or more control signals for the one or more individually addressable microLED emitters included in each of the one or more microLED regions may be determined based on the one or more region printing parameters. Light may be generated based on the one or more control signals. The one or more printing layers may be printed.

In some embodiments, a pixel pitch of the microLED array may be smaller than 50 μm.

In some embodiments, the microLED array may be arranged on one or more microLED sub-panels, and the one or more microLED sub-panels may be rotatable with respect to each other.

In some embodiments, each of the one or more microLED regions may be corresponding to one or more microLED sub-panels.

In some embodiments, position of at least one of the one or more individually addressable microLED emitter may be adjustable.

In some embodiments, the one or more microLED regions determined for different printing layers may be the same.

In some embodiments, the dynamically determining one or more microLED regions in a microLED array may include one or more of the following operations. A first microLED region for a first printing layer may be determined. A a second microLED region for a second printing layer may be determined, wherein the first microLED region may be different from the second microLED region.

In some embodiments, different printing layers may have different counts of microLED regions.

In some embodiments, a third microLED region may be determined for both of a third printing layer and a fourth printing layer. The third microLED region may generate first light with a first wavelength for the third printing layer, the third microLED region may generate second light with a second wavelength for the fourth printing layer, and the first wavelength may be different from the second wavelength.

In some embodiments, a fourth microLED region may be determined for a fifth printing layer and a fifth microLED region may be determined for a sixth printing layer. The fourth microLED region may output a first printing resolution for the fifth printing layer, the fifth microLED region may output a second printing resolution for the sixth printing layer; and the first printing resolution may be different from the second printing resolution.

In some embodiments, a sixth microLED region may be determined for a seventh printing layer and a seventh microLED region may be determined for an eighth printing layer. The sixth microLED region may output a first intensity of light for the seventh printing layer, the seventh microLED region may output a second intensity of light for the eighth printing layer; and the first intensity may be different from the second intensity.

In some embodiments, the one or more microLED regions may include different microLED regions, and the different microLED regions may have different counts of microLED emitters.

In some embodiments, the one or more microLED regions may include different microLED regions, and the different microLED regions may have a same count of microLED emitters.

In some embodiments, the region printing parameters for different microLED regions may be different.

In some embodiments, the one or more control signals may be configured to control at least one of a display status, an exposure time, a wavelength, or a modulation mode of the one or more individually addressable microLED emitters included in each of the one or more microLED regions.

In some embodiments, the modulation mode may include a Pulse Width Modulation (PWM) or a Pulse Frequency Modulation (PFM).

In some embodiments, the one or more individually addressable microLED emitters may include at least one of a red microLED emitter, a blue microLED emitter, a green microLED emitter, or an ultraviolet microLED emitter.

In some embodiments, the method may further include one or more of the following operations. A light beam produced by the one or more microLED regions may be collimated.

Supplement features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
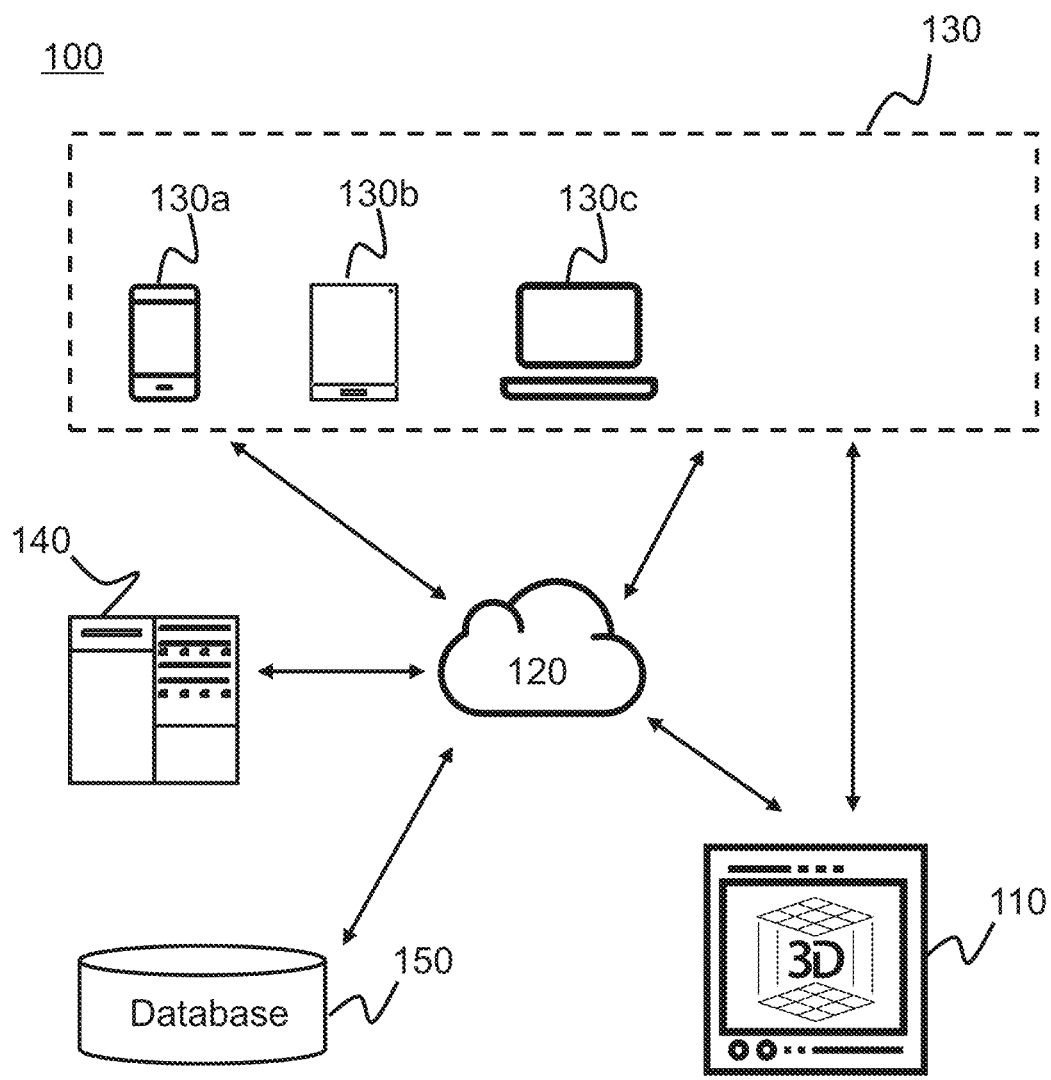
FIG. 1 is a schematic diagram illustrating an exemplary 3D printing system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "module," "unit," and/or "block" used herein are one method to distinguish different components, elements, parts, sections, or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or maybe invoked in response to detected events or interrupts. Software modules/units/blocks configured for execution on computing devices (e.g., CPU 220 illustrated in FIG. 2) may be provided on a computer-readable medium, such as a compact disc, a digital video disc, a flash drive, a magnetic disc, or any other tangible medium, or as a digital download (and can be initially stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when an engine, module, unit or block is referred to as being "on," "connected to," or "coupled to," another engine, module, unit or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

In one aspect of the present disclosure, systems and methods are described primarily in regard to a light irradiating device for 3D printing. The light irradiating device may include an array of light emitting units, e.g., a micro light emitting diode (microLED) array. The array of light emitting units may be controlled to project light with same or different intensity profiles (e.g., radiation patterns) to radiate different printing layers of an object.

In addition, one or more light emitting regions (e.g., microLED regions) in the array of light emitting units may be dynamically determined to achieve desired regional effects for each printing layer. Specifically, each of the light emitting regions and the light emitting units thereof may be individually and independently controlled to meet specific conditions (e.g., desired resolution and/or intensity) of one or more printing layers. By doing so, each light emitting unit may work in an independent status (e.g., in an "on" or "off" status, providing a distinctive gray level, providing a distinctive color), provided that all the light emitting units within a same light emitting region can generate the regional effect as needed. In some embodiments, the exposure intensities and/or exposure time of the light emitting units in each light emitting region may be independently controlled.

According to the embodiments of the present disclosure, by using the array of independently controlled light emitting units, which can be optionally grouped into different light emitting regions as the light source for the 3D printing, a better control on the quality of light and a longer service life for the light source can be achieved.

FIG. 1 is a schematic diagram illustrating an exemplary 3D printing system according to some embodiments of the present disclosure.

According to the embodiment shown in FIG. 1, the 3D printing system 100 may include a 3D printing device 110, a network 120, one or more terminals 130 (e.g., 130a, 130b, and 130c), a processing device 140, and a storage device 150.

Figure 5:
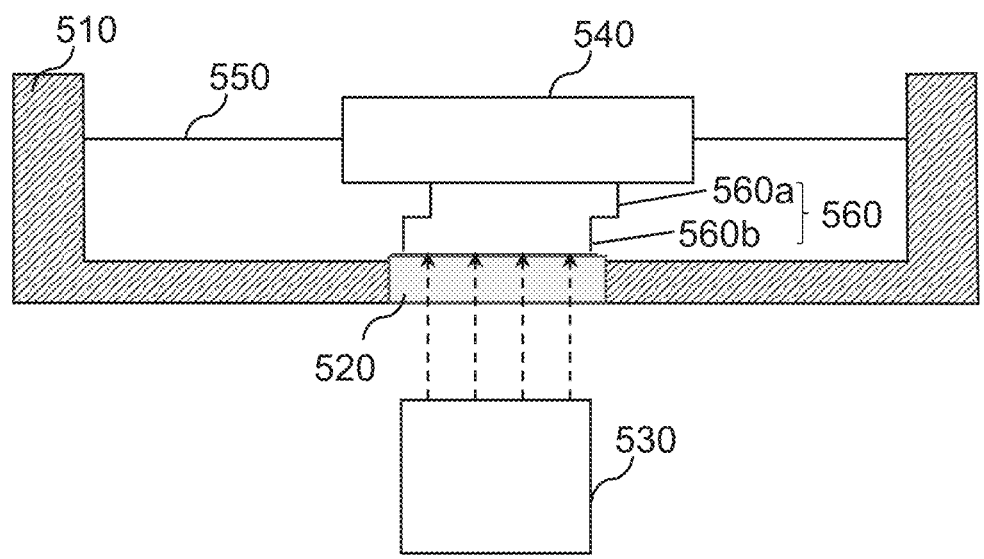
FIG. 5 is a schematic diagram illustrating an exemplary 3D printing device according to some embodiments of the present disclosure.

The 3D printing device 110 may be configured to print a 3D object based on a printing file. The printing file may include one or more machine instructions, which can be read and executed by the 3D printing device 110 for printing the 3D object. In some embodiments, the printing file may include a G-Code file. In some embodiment, the 3D printing device 110 may include a material vat 510, a build plate 540, and a light irradiating device 530 as shown in FIG. 5.

In some embodiments, the 3D printing device 110 may obtain the printing file from the storage device 150 and/or the processing device 140 via the network 120. The network 120 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the 3D printing system 100 may be connected to the network 120 to exchange data and/or information.

The terminal(s) 130 may include a mobile device 130a, a tablet computer 130b, a laptop computer 130c, or the like, or any combination thereof. The terminal(s) 130 may be configured to receive a user input for controlling a printing process of the 3D printing system. In some embodiments, the mobile device 130a may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™. In some embodiments, the terminal(s) 130 may be part of the processing device 140.

The processing device 140 may generate the printing file to control the 3D printing device 110 to print the 3D object. In some embodiments, the processing device 140 may generate the printing file based on a user input from the terminal(s) 130 and one or more 3D models stored in the processing device 140 or retrieved from the storage device 150 or the 3D printing device 110 via the network 120. In some embodiments, the processing device 140 may cause the 3D printing device 110 to implement one or more operations. For example, the processing device 140 may cause the 3D printing device 110 to obtain a printing file, print an object, check a status of a light irradiating device, perform a maintenance process, or the like.

Figure 2:
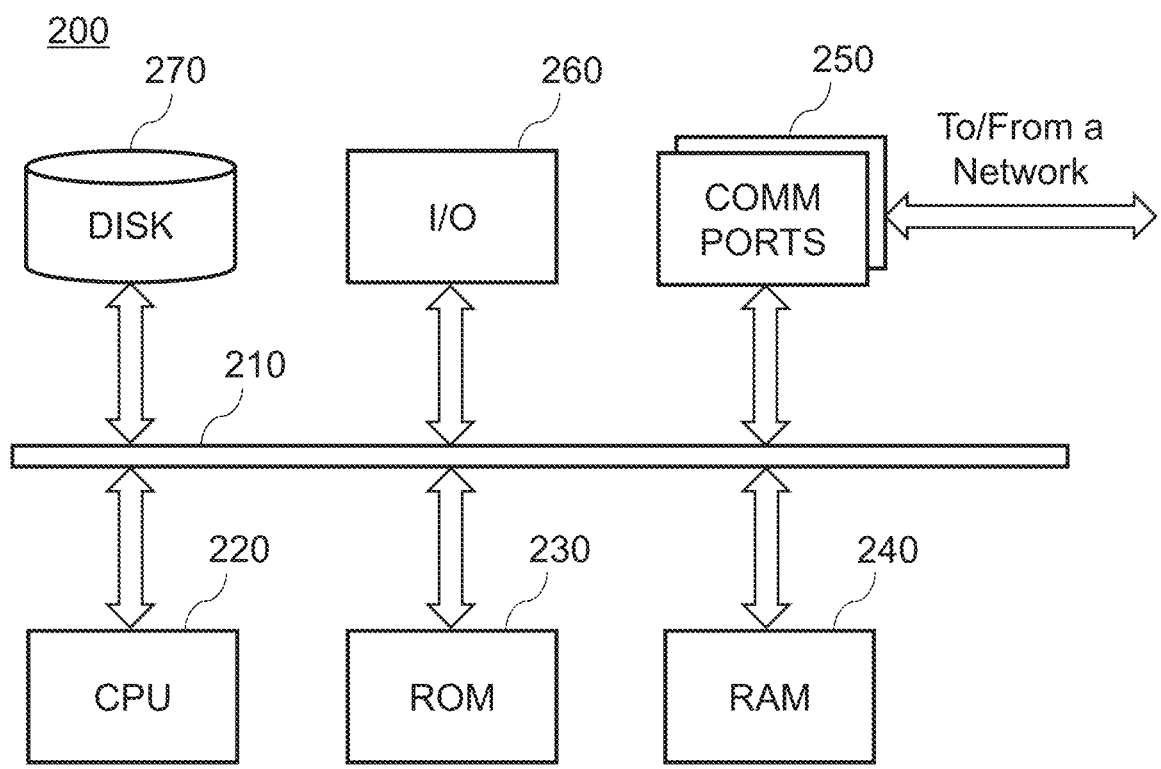
FIG. 2 is a schematic diagram illustrating an exemplary computing device on which the 3D printing system 100 can be implemented, according to some embodiments of the present disclosure.

In some embodiments, the processing device 140 may be a client, a single server, or a server group. The server group may be centralized or distributed. In some embodiments, the processing device 140 may be local to or remote from other components in the 3D printing system 100. Alternatively, the processing device 140 may be directly, instead of via the network 120, connected to the 3D printing device 110, the terminal 130 and/or the storage. In some embodiments, the processing device 140 may be implemented on a cloud platform to perform processing. For example, the processing device 140 may be implemented on the cloud platform to provide 3D printing instructions, detect whether an error appears in a 3D printing process, adjust the 3D printing process of the 3D printing device 110, or the like, or a combination thereof. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented by a computing device 200 having one or more components as illustrated in FIG. 2. In some embodiments, the processing device 140 may be part of the 3D printing device 140.

The storage device 150 may store information, data, instructions, and/or any other information. In some embodiments, the storage device 150 may store a plurality of 3D printing models. The 3D printing models may be used to generate a printing file by the processing device 140. In some embodiments, the 3D printing models may include a physical model (e.g., an analogous model), a digital model, a simplified model (e.g., a simple model), a complex model, or the like. In some embodiments, the storage device 150 may store information of one or more components of the 3D printing system 100, such as an array of light emitting units (e.g., a microLED array), a light emitting unit (e.g., a microLED emitter). Information of the microLED array may include distribution information of microLED emitters included in the microLED array, a count of the microLED emitters, position information of each of the microLED emitters, physical parameters (e.g., color type, peak wavelength, wavelength range, modulation mode) of each of the microLED emitters, usage information (e.g., frequency of usage, exposure time) of each of the microLED emitters, status information (e.g., good or bad, on or off) of each of the microLED emitters. In some embodiments, the storage device 150 may store feedback data obtained from the 3D printing device 110. The feedback data may include sensing data detected by one or more sensors of the 3D printing device 100, such as print speed, print temperature, print material supply levels, or the like. The feedback data may include one or more alarm signals generated by a controller of the 3D printing device 110. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components in the 3D printing system 100 (e.g., the 3D printing device 110, the processing device 140, the terminal 130). One or more components of the 3D printing system 100 may access the information or instructions stored in the storage device 150 via the network 120. In some embodiments, the storage device 150 may be directly connected to or communicate with one or more other components of the 3D printing system 100 (e.g., the processing device 140, the terminal 130). In some embodiments, the storage device 150 may be part of the processing device 140.

FIG. 2 is a schematic diagram illustrating an exemplary computing device on which the 3D printing system 100 can be implemented, according to some embodiments of the present disclosure.

The computing device 200 may be a general-purpose computer or a special purpose computer. Both may be used to implement an imaging system of the present disclosure. The computing device 200 may be used to implement any component of the service as described herein. For example, one or more components of the 3D printing device 110 and the processing device 140 of the 3D printing system 100 may be implemented on the computing device 200, via its hardware, software program, firmware, or a combination thereof. Although only one such computer is shown for convenience, the computer functions related to the 3D printing system 100 as described herein may be implemented in a distributed manner on a number of similar platforms to distribute the processing load.

The computing device 200, for example, may include COMM ports 250 connected to and from a network (e.g., the network 120) connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read-only memory (ROM) 230, or a random-access memory (RAM) 240, for various data files to be processed and/or transmitted by the computer. The exemplary computer platform may also include program instructions stored in the ROM 230, the RAM 240, and/or other types of non-transitory storage medium to be executed by the CPU 220. The methods and/or processes of the present disclosure may be implemented as the program instructions. The computing device 200 also includes an I/O 260, supporting input/output between the computer and other components therein. In some embodiments, the I/O 260 may include an input device and an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof. For example, the I/O 260 may be a display for displaying a 3D object or a plurality of printing layers of the 3D object determined by the processing device 140. As another example, the I/O 260 may be an input device to receive a printing request input by a user. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of the computing device 200 executes both steps A and step B. As in another example, step A and step B may also be performed by two different CPUs and/or processors jointly or separately in the computing device 200 (e.g., the first processor executes step A, and the second processor executes step B; or the first and second processors jointly execute steps A and B).

Figure 3:
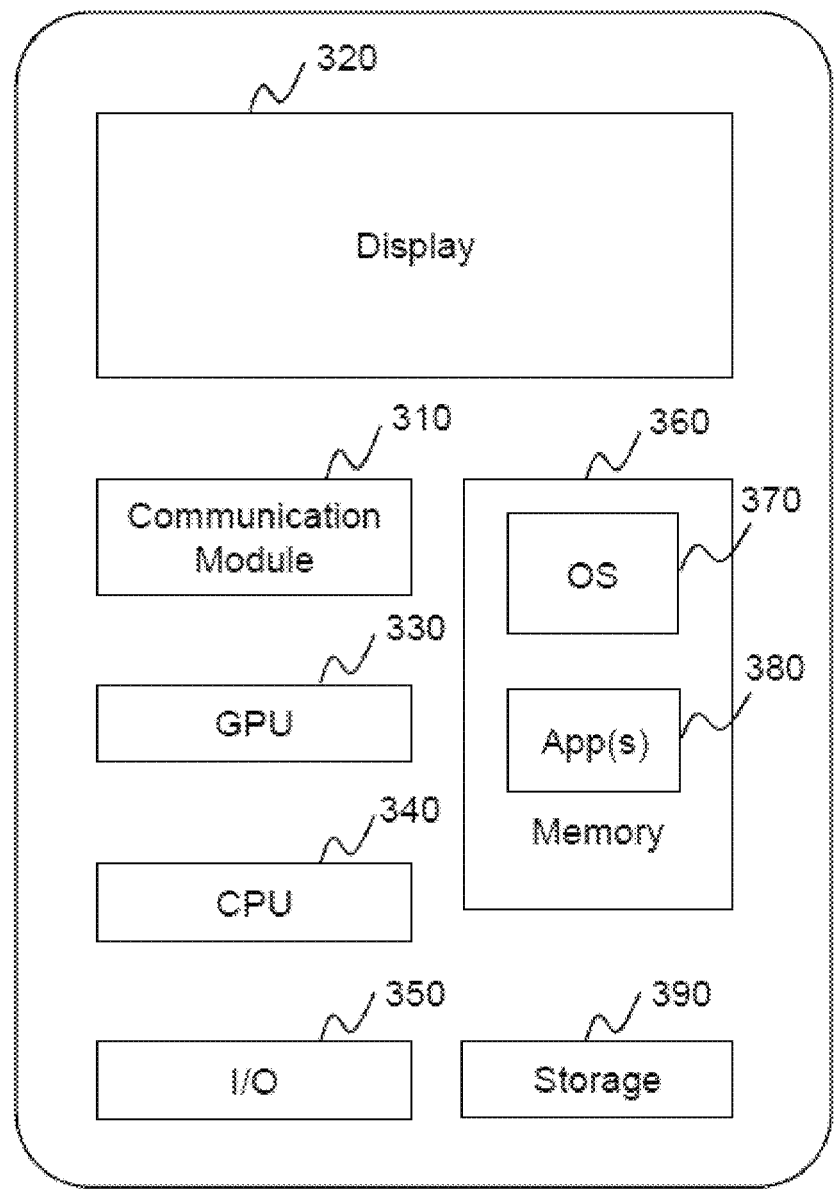
FIG. 3 is a schematic diagram illustrating exemplary hardware and/or software components of an exemplary mobile device on which the terminal 130 may be implemented according to some embodiments of the present disclosure.

FIG. 3 is a schematic diagram illustrating exemplary hardware and/or software components of an exemplary mobile device on which the terminal 130 may be implemented according to some embodiments of the present disclosure. As illustrated in FIG. 3, the mobile device 300 may include a communication module 310, a display 320, a graphics processing unit (GPU) 330, a central processing unit (CPU) 340, an I/O 350, a memory 360, and a storage device 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage device 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the 3D printing system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
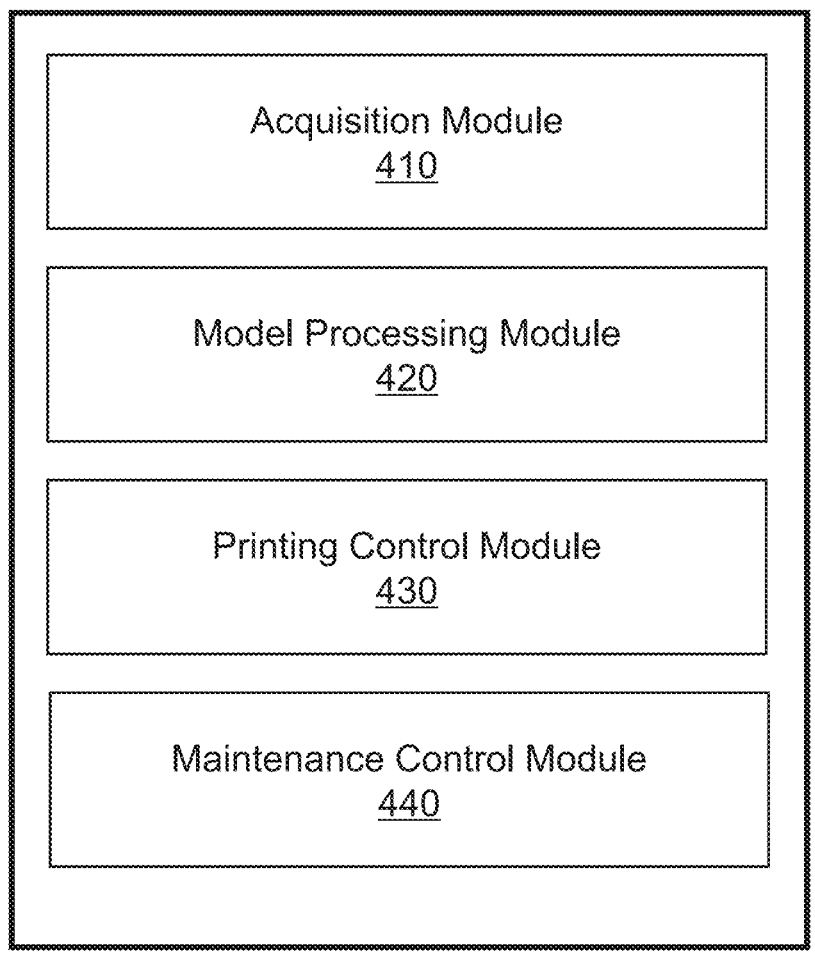
FIG. 4 is a schematic diagram illustrating an exemplary processing device according to some embodiments of the present disclosure.

FIG. 4 is a block diagram illustrating an exemplary processing device according to some embodiments of the present disclosure. The processing device 140 may include an acquisition module 410, a model processing module 420, a printing control module 430, and a maintenance control module 440. Components in the processing device 140 may be connected to or communicate with each other and/or other components in the 3D printing system 100, for example, the storage device 150, the terminal 130, or the 3D printing device 110, or the like, or a combination thereof. The processing device 140 may be implemented on the computing device 200 as illustrated in FIG. 2A.

The acquisition module 410 may be configured to obtain information related to a 3D printing process or the 3D printing device 110. The information may be obtained from any component of the 3D printing system 100, for example, the storage device 150, the terminal 130, or the 3D printing device 110, or the like, or a combination thereof. The information may include a printing request from a user terminal (e.g., the terminal 130 as shown in FIG. 1), a 3D printing model, information of a microLED array, or the like, or any combination thereof. In some embodiments, the printing request may include identification information of a print object (e.g., an ID or name of a print object, a file of a print object) and one or more print setting parameters (e.g., print resolution, material source, material type, object size, aspect ratio, light source orientation, quality, multi-wavelengths print, print time, print precision, print direction) relating to a 3D printing process, or the like, or any combination thereof. More descriptions regarding the 3D printing model and information of a microLED array may be found elsewhere in the present disclosure. See, e.g., FIG. 1 and relevant descriptions thereof.

The model processing module 420 may be configured to determine a 3D printing model corresponding to an object and/or a plurality of printing layers of the object. The 3D printing model may be created utilizing a computer-aided design package or reconstructed based on scanning data form a 3D scanner. The plurality of printing layers may be determined based on the 3D printing model and a printing request from a user. Exemplary computer-aided design packages for determining the 3D printing model and/or the plurality of printing layers may include, for example, 3Dmax, Rhinoceros (Rhino), Solidworks, Catia, Inventor, AutoCAD, UG, TinkerCAD, or the like, or any combination thereof.

The print control module 430 may be configured to determine a printing file based on the plurality of printing layers of the objects. The printing file may include control signals for controlling one or more light emitting units, e.g., microLED emitters in a microLED array. The control signal may be configured to perform a spatial control, a frequency control, or a color control (as known as wavelength control) on light produced by the light emitting units, or the like, or any combination thereof. For illustration purpose, a microLED array including a plurality of microLED emitters may be described as an example of the light emitting units in the following descriptions.

The spatial control may refer to a spatial control on the microLED array based on the spatial distribution of the microLED emitters. For example, the microLED emitters may be classified into different microLED regions (MLRs), each of which may include one or more microLED emitters. Under the spatial control, an intensity distribution of each microLED region may be specifically designed by controlling the operation of each microLED emitter in the microLED region. For example, by controlling a current through a microLED emitter or setting an "on" or "off" status of the microLED emitter in a microLED region, the intensity distribution of the microLED region may be adjusted.

The frequency control may refer to a control on the switching frequency of a microLED emitter in a microLED region. Under the frequency control, the print control module 430 may generate a control signal to manage the working status (e.g., "on" or "off" status) of a microLED emitter over a period of time. In some embodiments, a PWM (pulse width modulation) may be used as a dimmer for the frequency control.

The color control may refer to a control on a light color configuration generated by a microLED region. By incorporating microLED emitters with different wavelengths in the microLED region and/or by varying a mix of a light ensemble dynamically in the microLED region, a particular light color configuration may be achieved. In some embodiments, if a microLED region includes a red microLED emitter, a green microLED emitter, and a blue microLED emitter, a count of $N_R \times N_G \times N_B$ different colors may be generated by the microLED region, where $N_R$ refers to a count of intensity levels of the red microLED emitter, $N_G$ refers to a count of intensity levels of the green microLED emitter, $N_B$ refers to a count of intensity levels of the blue microLED emitter. $N_R$, $N_G$, and $N_B$ may be any positive integer. For example, $N_R$ may be 256, in which case the intensity level of the red color be indicated by any integer within the rage [0, 255]. The counts of intensity levels of the microLED emitters may be controlled by a control circuit. More descriptions regarding the light color configuration may be found elsewhere in the present disclosure. See, e.g., FIGS. 12A-12E and relevant descriptions thereof.

The maintenance control module 440 may be configured to inspect and/or calibrate one or more components in the 3D printing system. Conventionally, LED chips may decay in efficiency and intensity over time. A self-calibration mechanism may be performed by the maintenance control module 440 to identify one or more malfunctioning (e.g., decaying) microLED emitters. Then, the one or more malfunctioning microLED emitters may be recorded and the self-calibration mechanism may compensate the decay of the one or more malfunctioning microLED emitters with surrounding LED emitters. Specifically, the self-calibration mechanism may compensate the decay of one or more microLED emitters in a microLED region with other microLED emitters belonging to the same microLED region, thus maintaining the quality of light generated by the microLED region.

In some embodiments, the identification of the one or more malfunctioning microLED emitters may be performed based on an algorithm. In some embodiments, the identification of the one or more malfunctioning microLED emitters may be performed based on instructions from a user of the 3D printing system.

FIG. 5 is a schematic diagram illustrating an exemplary 3D printing device according to some embodiments of the present disclosure. The 3D printing device 110 may include a material vat 510, a build plate 540, and a light irradiating device 530. The 3D printing device 110 may include a top-down build orientation 3D printing device or a bottom-up build orientation 3D printing device. For convenience of description, the bottom-up build orientation 3D printing device may be described as an example in the following description.

The material vat 510 may be configured to hold a printing material 550. In some embodiments, the printing material 550 may include one or more photopolymerizable materials, such as free radical photopolymerizable materials for using in a free radical photopolymerization process, cationic photopolymerizable materials for using in a cationic photopolymerization process. Examples of the free radical photopolymerizable materials may include acrylics, methacrylics, N-Vinylpyrrolidone, acrylamides, styrene, olefins, halogenated olefins, cyclic alkenes, maleic anhydride, alkenes, alkynes, carbon monoxide, functionalized oligomers (for example, oligomers such as epoxides, urethanes, polyethers, or polyesters functionalized with acrylates or methacrylates groups), or functionalized PEGs, or the like, or a combination thereof. Examples of the cationic photopolymerizable materials may include epoxide groups and vinyl ether groups. In some embodiments, the photopolymerizable materials may include styrenic compounds, vinyl ethers, N-vinyl carbazoles, lactones, lactams, cyclic ethers (e.g., epoxides), cyclic acetals, or cyclic siloxanes, or the like, or any combination thereof.

The material vat 510 may include a window 520 in its bottom through which radiation is transmitted to cure the photopolymerizable materials to form a 3D printed object 560. In some embodiment, the material vat 510 may further include an inlet and an outlet (not shown in FIG. 5) for delivering one or more species or the printing material 550. In some embodiments, the one or more species may include photon absorbing species, which may include light blocking dyes. In some embodiments, the one or more species may include a photoinitiator (e.g., camphorquinone), a co-initiator (e.g., ethyl-dimethyl-amino benzoate), a photoinhibitor (e.g., tetraethylthiuram disulfide). In some embodiments, one or more photoinitiators and/or light blacking dyes, mixed with the photopolymerizable materials, may be directly included in the material vat 510.

The 3D printed object 560 may be printed in a layer-by-layer fashion, thus including a plurality of printing layers (e.g., 560a, 560b). The plurality of printing layers may have a same or different thickness. The 3D printed object 560 may be printed on the build plate 540. In some embodiments, the build plate 540 may be connected to one or more 3D printing mechanisms (not shown in FIG. 5) via a rod. The 3D printing mechanism may include one or more mechanical structures for moving the build plate 540 with respect to the material vat 510. Alternatively, the movement between the material vat 510 and the build plate 540 may be achieved by only moving the material vat 510, or moving both of the material vat 510 and the build plate 540, respectively, in various implementations.

The light irradiating device 530 may be positioned below the window 520 and connected to one or more components of the 3D printing system 100, for example, the processing device 140. The light irradiating device 530 may be configured to provide light for curing the printing material 550 in a 3D printing process. In some embodiments, the light irradiating device 530 may include different light emitting regions (e.g., microLED regions) that can be independently and dynamically controlled to produce light, that is, the light provided by the light irradiating device 530 may include different light components corresponding to different light emitting regions. The one or more light components may have any desired shape, wavelength, light intensity, color, or the like, or any combination thereof.

It should be noted that the above descriptions of the 3D printing device 110 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the 3D printing device 110 may include one or more additional components. Additionally or alternatively, one or more components of the 3D printing device 110 described above may be omitted. For example, the window 520 in the material vat 510 may be omitted. As another example, the 3D printing device 110 may further include a motor for actuating the movement of the material vat 510 or the build plate 540, a scanning device (e.g., a 3D scanner), a control device, and/or a decoding device for decoding a control signal for the light irradiating device 530.

Figure 6:
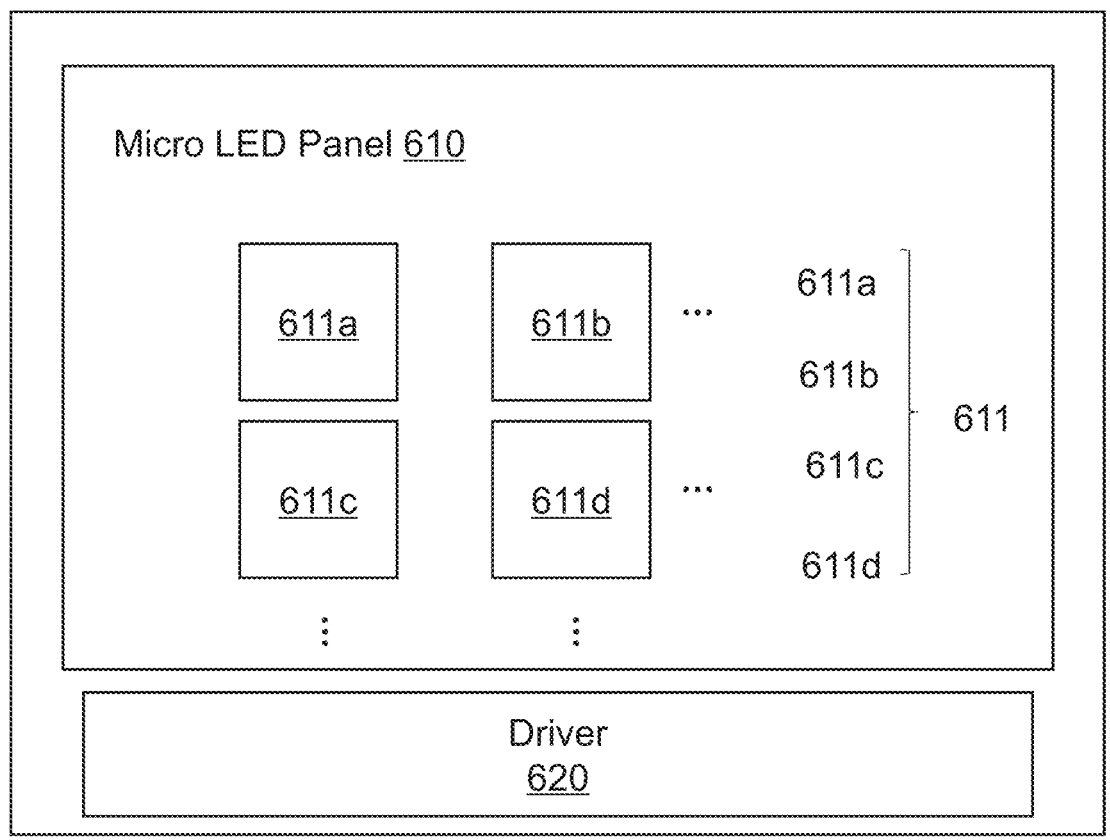
FIG. 6 is a block diagram illustrating an exemplary light irradiating device according to some embodiments of the present disclosure.

FIG. 6 is a schematic diagram illustrating an exemplary light irradiating device according to some embodiments of the present disclosure. The light irradiating device 530 may include a microLED panel 610, a backplane (not shown in FIG. 6), and a driver 620.

The microLED panel 610 may include one or more microLED emitters 611 (e.g., 611a, 611b, 611c, and 611d). The one or more microLED emitters 611 may be any type of microLED emitter. For example, the microLED emitter may be a visible light microLED emitter (e.g., a red (R) microLED emitter, a blue (B) microLED emitter, and a green (G) microLED emitter), an ultraviolet (UV) microLED emitter, an infraredlight (IR) microLED emitter, or the like. In some embodiments, different microLED emitters 611 may include the same or different films, electrodes, and/or substrates. The electrode may include an n-electrode, a p-electrode, or the like, or a combination thereof. The substrate may include a gallium-nitride-onsilicon substrate, a GaN-on-silicon substrate, a silicon substrate, or the like, or a combination thereof.

In some embodiments, different microLED emitters 611 may include a same or different physical parameters. The physical parameter of a microLED emitter may include a wavelength (e.g., a peak wavelength, a wavelength range) of the light produced by the microLED emitter, a color of the light produced by the microLED emitter, a gray level (also refer to as brightness) of the microLED emitter, or the like, or any combination thereof.

In some embodiments, the microLED panel 610 may be divided, based on an algorithm, into one or more microLED regions for providing light for one or more printing layers. Each of the microLED regions may include one or more microLED emitters. Depending on a printing requirement of each printing layer, the counts of microLED regions in different microLED regions may be the same or different. For each printing layer, the counts of microLED emitters within different microLED regions may be the same or different. In some embodiments, each of the one or more microLED emitters 611 in each of the one or more microLED regions may be individually and independently controlled to produce light.

In some embodiments, different microLED emitters may be controlled based on the same or different modulation technologies. The modulation technology may include a pulse width modulation (PWM), a pulse frequency modulation (PFM), a non-return-to-zero on-off keying (NRZ-OOK) modulation scheme, a on-off keying (OOK) modulation scheme, or the like, or any combination thereof. In some embodiments, for one printing layer, the microLED emitters in all the microLED regions may be modulated through PWM. In some embodiments, for one printing layer, the microLED emitters in all the microLED regions may be modulated through PFM. In some embodiments, for one printing layer, the microLED emitters in some microLED regions may be modulated through PWM while the microLED emitters in other microLED regions may be modulated through PFM. In some embodiments, for one printing layer, within one microLED region, all microLED emitters may be modulated through PWM. In some embodiments, for one printing layer, within one microLED region, all microLED emitters may be modulated through PFM. In some embodiments, for one printing layer, some microLED emitters in one microLED region may be modulated through PWM while the other microLED emitters in the same microLED region may be modulated through PFM. Such individual and independent pixel-level modulation may be selectively controlled to achieve various printing quality requirements, including but not limited to the requirements of material properties, surface texturing, skin effects, through thickness effects, complex printing structure (e.g., overhangs and curved structures), or the like, or any combination thereof.

In some embodiments, each of the one or more micro LED regions may correspond to one or more microLED sub-panels. For example, a microLED region may be determined based on more than one (e.g., two) microLED sub-panels, i.e., the microLED region may include microLED emitters from the more than one microLED sub-panels. For another example, a microLED region may be determined based on at least a portion of a microLED sub-panel, i.e., a portion of microLED emitters of the microLED sub-panel may be included in the microLED region leaving some microLED emitters of the microLED sub-panel not included in the microLED region.

All of the microLED emitters 611 included in the microLED panel 610 may form a microLED array. In some embodiments, the microLED array may include hundreds of thousands or even millions of microLED emitters 611. A pitch (also referred to as a pixel pitch) P of the microLED array may be smaller than 200 µm. As used herein, a pitch of a microLED array is the distance between two neighboring microLED emitters, which can be represented by the distance between the center of a microLED emitter (also referred to as a first pixel) in the microLED array and the center of a neighboring microLED emitter (i.e., a neighboring pixel) in the microLED array. In some embodiments, the pitch of the microLED array may be smaller than 200 µm, 180 µm, 150 µm, 120 µm, 100 µm, 80 µm, 60 µm, 50 µm, 30 µm, 25 µm, 23 µm, 20 µm, 19 µm, 18 µm, 17 µm, 16 µm, 15 µm, 14 µm, 13 µm, 12 µm, 11 µm, 10 µm, 9 µm, 8 µm, 7 µm, 6 µm, 5 µm, 4 µm, 3 µm, 2 µm, 1 µm, 800 nm, 700 nm, 600 nm, 500 nm, 400 nm, 300 nm, 200 nm, 100 nm, 50 nm, 20 nm, 10 nm, 5 nm, 2 nm, or the like. For convenience of description, a microLED emitter may be abstracted as a round with a diameter D or a rectangle with length L and width W. A size (e.g., the diameter D, the length L, or the width W) of a microLED emitter in the microLED array may be any value less than 200 µm. For example, the size of the microLED emitter may be less than 200 µm, 180 µm, 160 µm, 140 µm, 120 µm, 100 µm, 80 µm, 60 µm, 40 µm, 30 µm, 20 µm, 15 µm, 14 µm, 13 µm, 12 µm, 11 µm, 10 µm, 9 µm, 8 µm, 7 µm, 6 µm, 5 µm, 4 µm, 3 µm, 2 µm, 1 µm, 800 nm, 700 nm, 600 nm, 500 nm, 400 nm, 300 nm, 200 nm, 100 nm, 50 nm, 20 nm, 10 nm, 5 nm, 2 nm, or the like.

In some embodiments, the size of the microLED emitter in the microLED array and the pitch of the microLED array may be determined based on requirements of the 3D printing system 100. For example, printing size may be no smaller than 50 cm$^2$, 100 cm$^2$, 150 cm$^2$, 300 cm$^2$, 500 cm$^2$, 1000 cm$^2$, 1500 cm$^2$, 2000 cm$^2$, 2500 cm$^2$, 3000 cm$^2$, or the like. In one embodiment, a 30 cm×30 cm array with an area as large as 900 cm$^2$ may be used. In another embodiment, the microLED array may have a pitch of 10 µm, with neighboring microLED emitters having a spacing of 0 µm and each microLED emitter having a maximum width of 10 µm. In another embodiment, the microLED array may have a pitch of 5 µm, with neighboring microLED emitters having a spacing of 2 µm and each microLED emitter having a maximum width of 3 µm. It shall be noted that embodiments of the present disclosure are not limited to the above dimensions, and any suitable dimension may be utilized.

In some embodiments, the microLED array may include one or more microLED sub-arrays. Each of the one or more microLED sub-array may be arranged on a microLED sub-panel. Different microLED sub-arrays (i.e., the one or more microLED sub-panels) may have a same or different configurations. For example, a microLED sub-array may be a 15 cm×30 cm array composed of three colors (e.g., R, G, B) microLED emitters, and another microLED sub-array may be a 5 cm×30 cm array composed of single color (e.g., UV) microLED emitters.

The microLED panel 610 may have a maximum resolution and may output a printing resolution with an adjustable value ranging from zero to the maximum resolution. As used herein, the maximum resolution may also be referred to as an innate resolution, which depends on a count of microLED emitters 611 included in the array. The maximum resolution of the microLED panel 610 may be no less than 10N pixels per inch in a direction, where N is any integer (e.g., 0, 1, 2, 3, 4, 5, 6, 7, 8, 9, 10, 11, 12, 13, 14, etc.) and the direction may be a diagonal direction, a width direction (also referred to as a horizontal direction), or a height direction (also referred to as a vertical direction). In some embodiments, a definition of the microLED panel 610 may be in a level of high definition (HD), 4K, 8K, or the like. For example, the maximum resolution of the microLED panel 610 in the width direction (also referred to as a maximum horizontal resolution) may be no less than 120, 360, 720, 1440, 1920, 1998, 2048, 2560, 3840, 3996, 4096, 7680, 7992, 8192, or the like. For another example, the maximum resolution of the microLED panel 610 in the height direction (also referred to as a maximum vertical resolution) may be no less than 1080, 1716, 2160, 3432, 4320, or the like. The printing resolution may be a desired resolution in a printing process which depends on a count of microLED emitters 611 actually used in a printing process to meet a particular printing requirement. The concept of maximum resolution and printing resolution may also be applied to the one or more microLED regions. During a printing process, the printing resolution of each of the one or more microLED regions may be adjustable. For example, a specific microLED region may output a first printing resolution for printing a first printing layer of an object, and output a second printing resolution, which is different from the first printing resolution, for printing a second printing layer of the object. For another example, the specific microLED region may output the first printing resolution and the second printing resolution at different times for printing a same printing layer of the object.

In some embodiments, one or more secondary optical elements may be coupled with the microLED array to achieve a specific illumination effect. In some embodiments, the one or more secondary optical elements may be configured to perform light collimation and reduce light source overlap effects. For example, a collimated and wide angle projection of the microLED array can be selectively controlled by the secondary optical elements to optimize the illumination effect of the entire array. For another example, the collimated and wide angle projection of the microLED array may be selectively controlled by the secondary optical elements to achieve a predetermined radiation pattern (e.g., intensity profile). More descriptions regarding the one or more secondary optical elements may be found elsewhere in the present disclosure. See, e.g., FIGS. 15-17 and relevant descriptions thereof.

The driver 620 may be configured to drive the microLED panel 610. The driver 620 may be a voltage driving circuit, a current driving circuit, a passive matrix driving circuit, or the like, or a combination thereof. For example, in a passive matrix driving circuit, a P-electrode of a microLED emitter (e.g., the microLED emitter 934) may be connected to the data line 910, and an N-electrode of the microLED emitter may be connected to the scan line 920. In some embodiments, each of the microLED emitter may be individually and independently addressed. For example, when the X-th row scan line and the Y-th column data line are gated, the microLED emitter connected to both the X-th row scan line and the Y-th column data line (i.e., the microLED emitter at an the intersection (X, Y)) may be selected to produce light.

Each of the microLED emitters 611 in the microLED panel 610 may be individually and independently addressed by the driver 620, such that the driver 620 may independently control the working status of each microLED emitter. In such case, the microLED emitters 611 may also be referred to as individually addressable microLED emitters. In some embodiments, the driver 620 may employ a two-transistor-one-capacitor (2T1C) structure, a four-transistor-two-capacitor (4T2C) structure, or the like, or a combination thereof. More descriptions regarding the two-transistor-one-capacitor structure may be found elsewhere in the present disclosure. See, e.g., FIG. 9 and relevant descriptions thereof.

It should be noted that the above descriptions of the light irradiating device 530 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the light irradiating device 530 may include one or more additional components. Additionally or alternatively, one or more components of the light irradiating device 530 described above may be omitted. For example, the light irradiating device 530 may further include a controller for determining driving signals of the driver 620.

Figure 7:
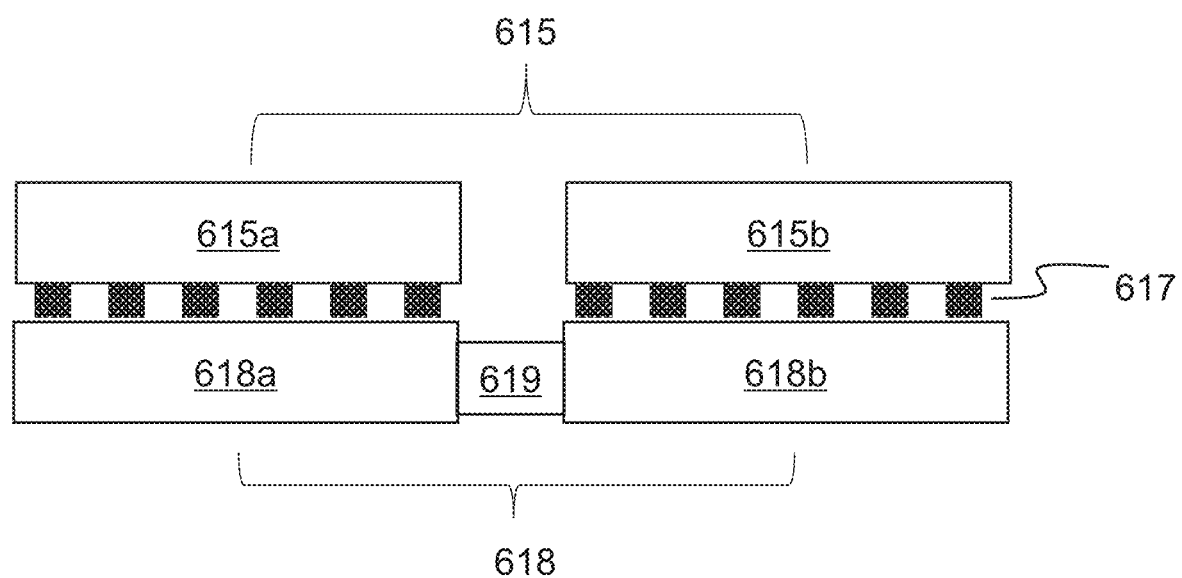
FIG. 7 is a cross-sectional side view of an exemplary microLED panel according to some embodiments of the present disclosure.

FIG. 7 is a cross-sectional side view of an exemplary microLED panel according to some embodiments of the present disclosure. In some embodiments, the microLED panel 610 may include one or more microLED sub-panels 615 (e.g., 615a, 615b). The microLED sub-panel(s) 615 may be connected to one or more backplanes 618 (e.g., 618a, 618b) through a plurality of connectors 617. The count of microLED sub-panels 615 may be any positive integer, which is not limited herein.

In some embodiments, different microLED sub-panels 615 may have a same or different shapes. For example, the microLED sub-panel 615a may have the shape of a square, and the microLED sub-panel 615b may have the shape of a rectangle. In some embodiments, each of the microLED sub-panel(s) 615 may support a microLED emitter sub-array which includes one or more microLED emitters. More descriptions regarding the microLED emitter may be found elsewhere in the present disclosure. See, e.g., FIG. 6 and relevant descriptions thereof.

In some embodiments, the backplane(s) 618 may include a plurality of CMOS cells. Each COMS cell may correspond to one microLED emitter in the microLED sub-panel(s) 615 to individually drive the microLED emitter. The plurality of microLED emitters 611 may be electrically connected to the corresponding COMS cells through the plurality of connectors 617. In some embodiments, the plurality of microLED emitters 611 may be arranged to face the CMOS cells.

In some embodiments, each of the microLED sub-panel(s) 615 may correspond to a distinctive backplane. For example, the microLED sub-panel 615a may connect to the backplane 618a, the microLED sub-panel 615b may connect to the backplane 618b, and the backplane 618a and the backplane 618b may be connected to each other through a connector 619. The backplane 618a, 618b and the connector 619 may include the same material or different materials. The material of the backplanes or the connector may include rigid material or flexible material. In some alternative embodiments, more than one microLED sub-panel(s) 615 may share a same backplane with a suitable size.

Figure 8A:
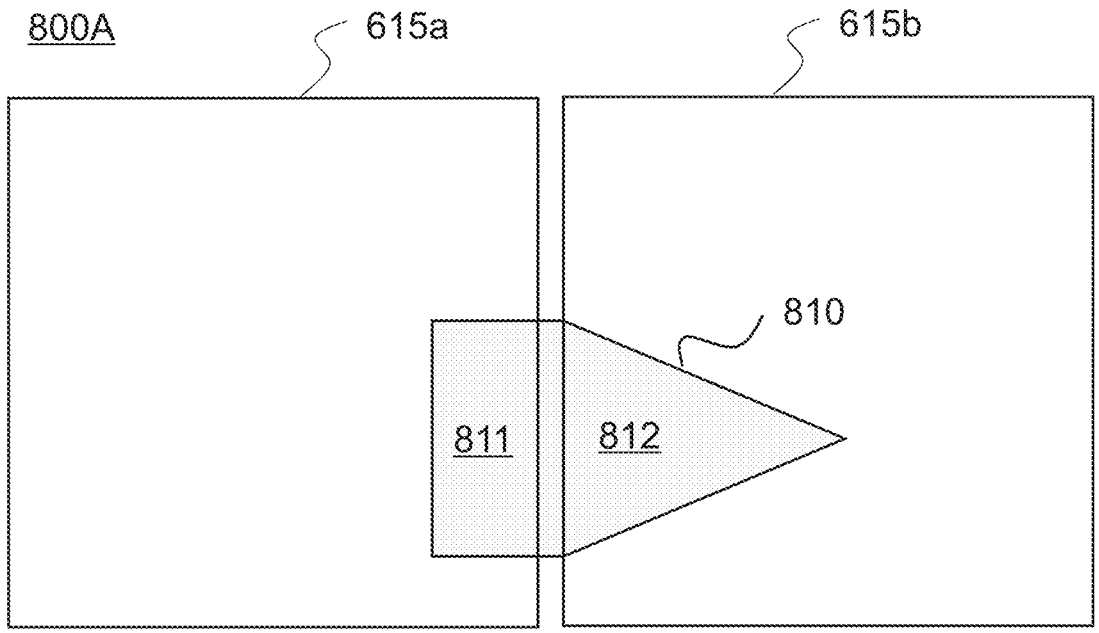
FIGS. 8A and 8B are schematic diagrams illustrating an exemplary rotating and/or shifting mechanism of a microLED sub-panel according to some embodiments of the present disclosure.
Figure 8B:
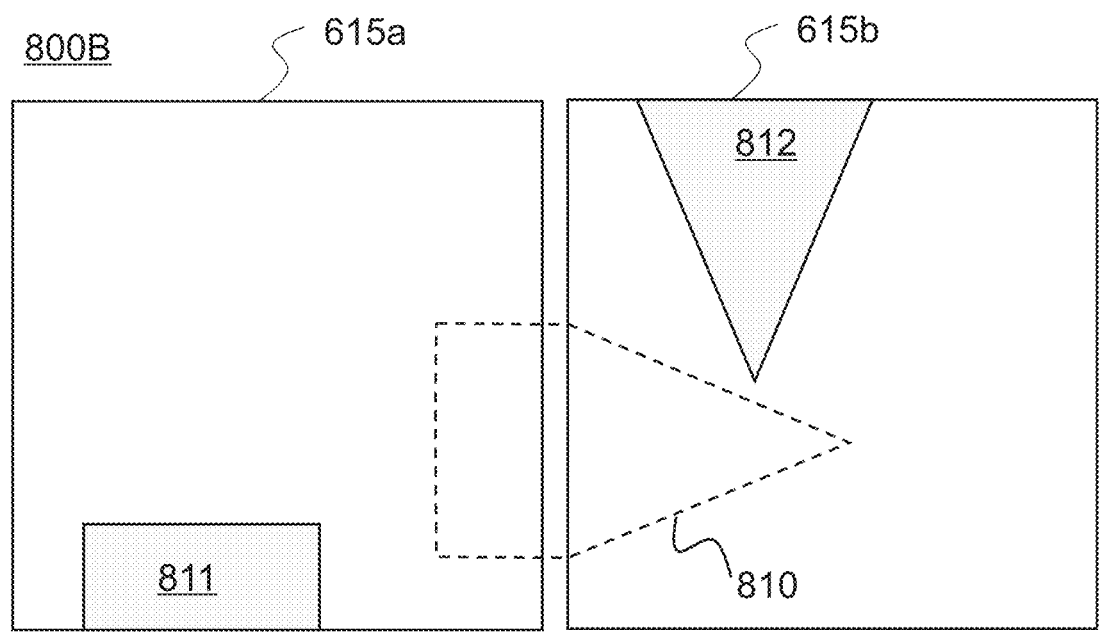

FIGS. 8A and 8B are schematic diagrams illustrating an exemplary rotating and/or shifting mechanism of a microLED sub-panel according to some embodiments of the present disclosure.

It shall be noted that frequency of usage of each of the microLED emitters in a microLED array or sub-array may be different. This may result in that a microLED region whose microLED emitters are used in a higher frequency may be more susceptible to damage.

As shown in FIGS. 8A-8B, microLED emitters in region 810 may be used in a higher frequency than other regions. The region 810 may include a microLED region 811 in the microLED sub-panel 615a and a microLED region 812 in the microLED sub-panel 615b. That is to say, a first set of microLED emitters in the microLED region 811 and a second set of microLED emitters in the region 812 may suffer a higher risk of being damaged. By rotating the microLED sub-panel 615a and/or the microLED sub-panel 615b with a suitable angle (e.g., 90°), the region 810 may overlap with other microLED regions (which is different from the microLED region 811 and/or the microLED region 812) in the microLED sub-panels 615a and 615b. By doing so, different microLED emitters may be alternately moved to a region where the microLED emitters are more frequently used, thus avoiding only some of the microLED emitters in the array or sub-array from being overused. As a result, position of the microLED emitters in the microLED panel 610 is adjustable and the lifetime of the microLED emitters in the microLED panel 610 may be extended.

In some embodiments, one or more microLED sub-panels may be rotated by a certain angle or moved by a certain distance. For example, compared with FIG. 8A, both the microLED sub-panels 615a and 615b in FIG. 8B are rotated clockwise by 90° along an axis perpendicular to the microLED panel 610. As a result, the microLED regions 811 and 812 may not overlap with the region 810. In some embodiments, the rotated angle and direction, and/or the moved distance of a microLED sub-panel may be determined by an operator, or may be determined based on an algorithm performed by the processing device 140. In some embodiments, the one or more microLED sub-panels may be individually replaced.

Figure 9:
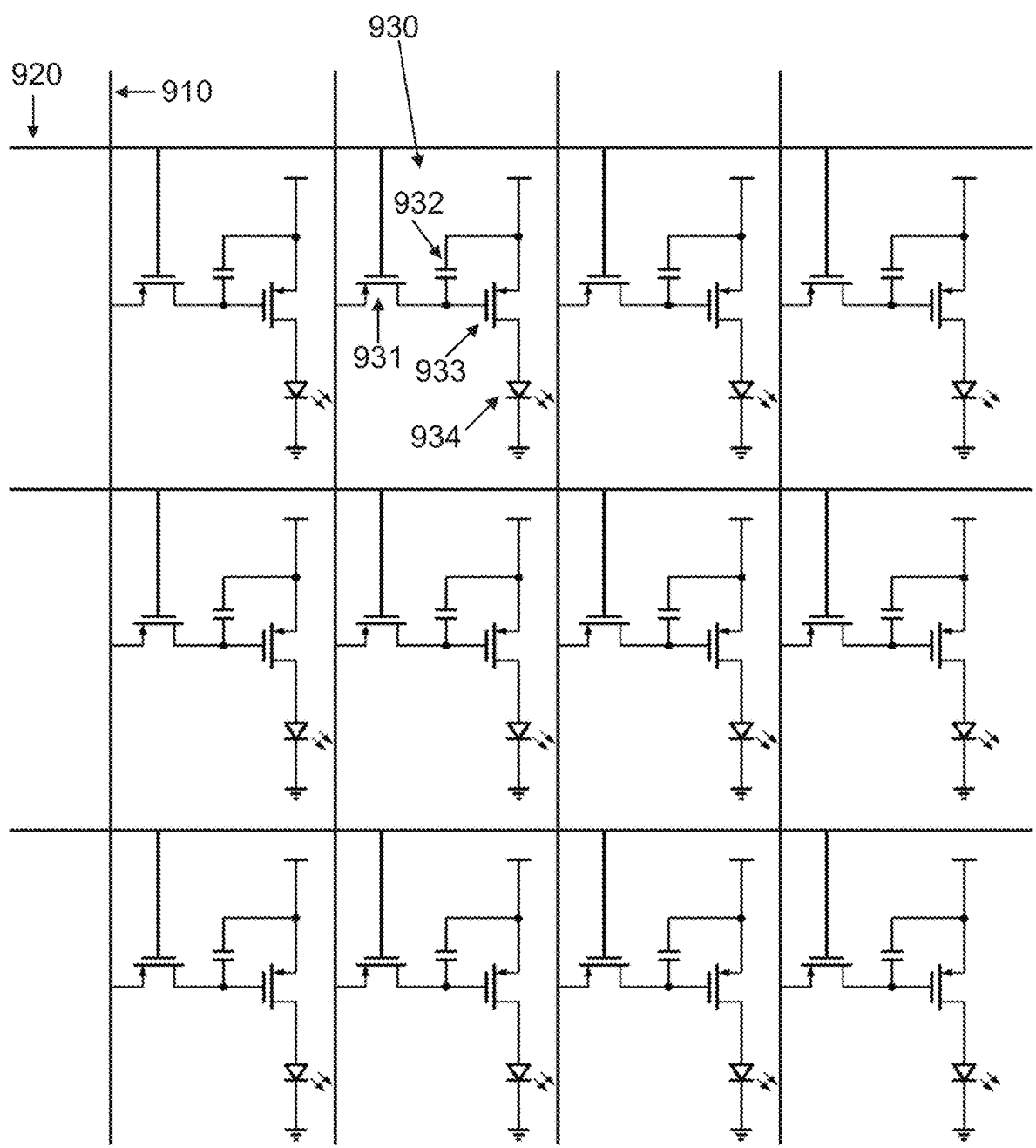
FIG. 9 is a schematic diagram illustrating an exemplary microLED array driving circuit according to some embodiments of the present disclosure.

FIG. 9 is a schematic diagram illustrating an exemplary microLED array driving circuit according to some embodiments of the present disclosure.

The microLED array driving circuit 900 may include one or more data lines 910, one or more scan lines 920, and one or more pixel circuits 930. The pixel circuits 930 are arranged in a matrix form, and each pixel circuit 930 may include a microLED emitter.

As shown in FIG. 9, the pixel circuit 930 may include a switch transistor 931, a driving transistor 933, and a storage capacitor 932. When the switch transistor 931 is turned on by the scan line 920, the value of the data line 910 may be stored at the storage capacitor 932, which sets a $V_{GS}$ bias of the driving transistor 933. Then, a voltage of the storage capacitor 932 may be converted by the driving transistor 933 to an amount of current going to the microLED emitter 934, which consequently produces light. Even after the switch transistor 931 is turned off, the current level of the microLED emitter 934 may be kept by the charge stored at the storage capacitor 932. In order to obtain a consistent light intensity of the emitter 934, the pixel circuit 930 with a stable charge during a given frame time may be desired.

It should be noted that the above descriptions of the microLED array driving circuit 900 are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the microLED array driving circuit 900 may be a common anode circuit, and the storage capacitor 932 may be connected to the driving transistor 933 and both of the storage capacitor 932 and the driving transistor 933 may be connected to ground. The microLED emitter 934 may be connected to a power supply and the driving transistor 933.

Figure 10:
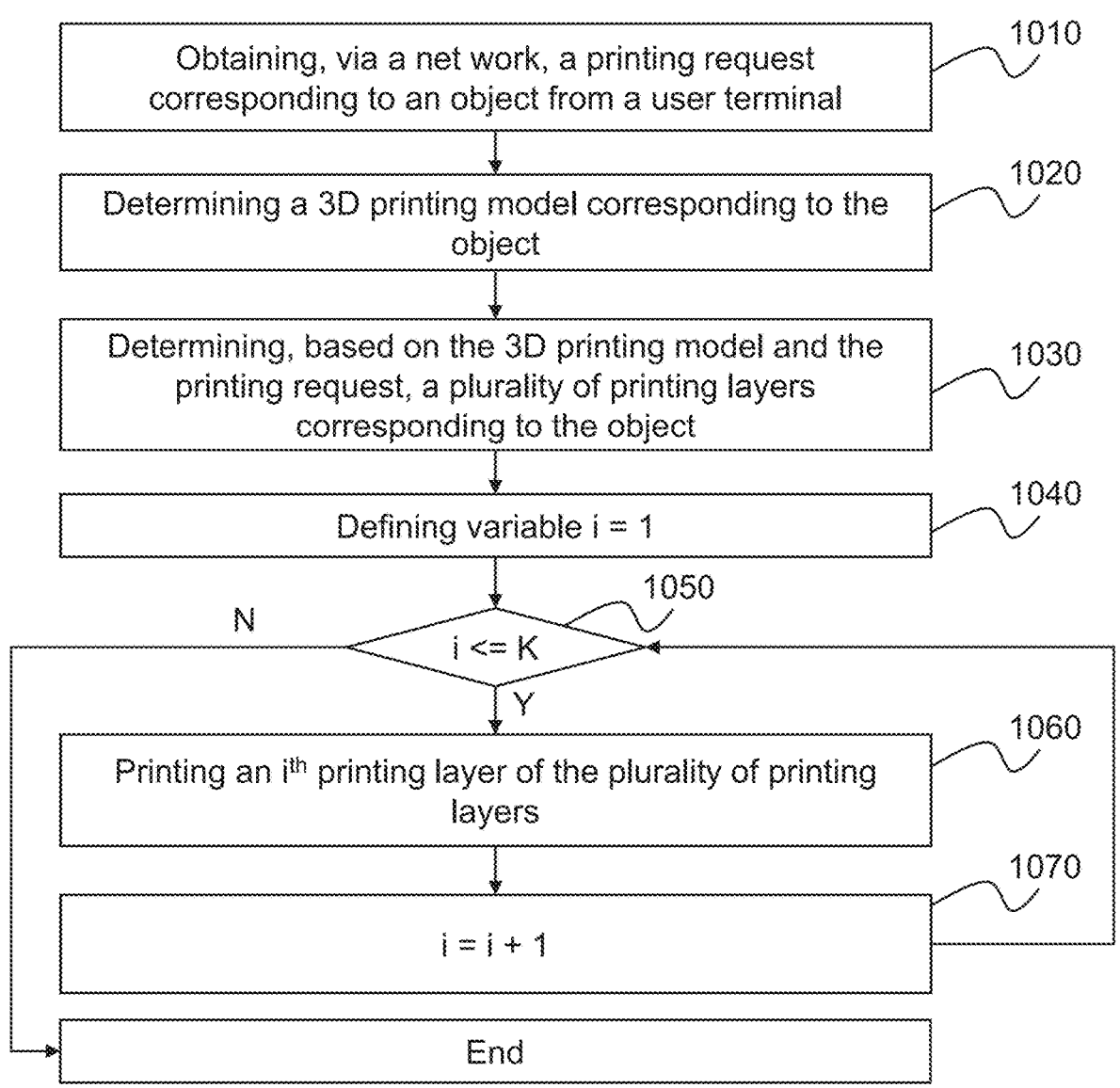
FIG. 10 is a flowchart of an exemplary process of printing a 3D object according to some embodiments of the present disclosure.

FIG. 10 is a flowchart of an exemplary process of printing a 3D object according to some embodiments of the present disclosure. In some embodiments, one or more operations of the process 1000 illustrated in FIG. 10 may be implemented in the 3D printing system 100 illustrated in FIG. 1. For example, the process 1000 illustrated in FIG. 10 may be stored in the storage device 150 in the form of instructions, and invoked and/or executed by the processing device 140 (e.g., the processor of a computing device). As another example, a portion of the process 1000 may be implemented on the 3D printing device 110.

In 1010, a printing request corresponding to an object may be obtained via a network from a user terminal (e.g., the terminal 130). In some embodiments, the operation 1010 may be implemented by the acquisition module 410 of the processing device 140. The printing request may include identification information of a print object and one or more print setting parameters, or the like, or any combination thereof. More descriptions regarding the printing request may be found elsewhere in the present disclosure. See, e.g., FIG. 4 and relevant descriptions thereof.

In 1020, a 3D printing model corresponding to the object may be determined. In some embodiments, the operation 1020 may be implemented by the model processing module 420 of the processing device 140. The 3D printing model may be generated by the model processing module 420 or retrieved from a storage (e.g., the storage 150). More descriptions regarding the printing request may be found elsewhere in the present disclosure. See, e.g., FIG. 4 and relevant descriptions thereof.

In 1030, a plurality of printing layers corresponding to the object may be determined based on the 3D printing model and the printing request. In some embodiments, the operation 1030 may be implemented by the model processing module 420 of the processing device 140.

A count of the plurality of printing layers may be determined automatically, or semi-automatically, or manually. In an automatic approach, the count of the plurality of printing layers may be determined based on an algorithm. For example, the count of the plurality of printing layers $N_{layer}$ may be determined according to $N_{layer}=T_o/T_d$, wherein $T_o$ refers to thickness of a printing object and $T_d$ refers to thickness of a printing layer. In a manual approach, the count of the plurality of printing layers may be determined according to an instruction provided by a user. For example, the count of the plurality of printing layers may be inputted by a user through the printing request. In a semi-automatic approach, the count of the plurality of printing layers may be adjusted by a computing device (e.g., the computing device 200 as illustrated in FIG. 2) with user intervention. For example, the count of the plurality of printing layers may be determined based on an algorithm and information (e.g., printing precision) inputted by a user through the printing request, and the determined count of the plurality may be further adjusted by the user.

The plurality of printing layers may have a same or different thickness. In some embodiments, the thickness of a printing layer may be 0.001 mm 2.0 mm. In some embodiments, the thickness of a printing layer may be not larger than 0.001 mm, 0.005 mm, 0.008 mm, 0.01 mm, 0.05 mm, 0.10 mm, 0.15 mm, 0.20 mm, 0.25 mm, 0.30 mm, 0.35 mm, 0.40 mm, 0.50 mm, 1.0 mm, 2.0 mm, or the like. In some embodiments, the thickness of each of the plurality of printing layers may be determined based on printing precision which is determined based on an algorithm or user requirement. For example, a finer printing precision may correspond to a smaller thickness.

In some embodiments, each of the plurality of printing layers may include one or more printing images. The one or more printing images in a printing layer may be radiated by light generated by different microLED regions. For example, in printing a cross-section of a table, four printing regions corresponding to four table legs may be determined in a printing layer. The four printing regions may be shown in one or more images (e.g., four images) and be used to determine four or more microLED regions, respectively. For another example, in printing a desired object with different structures of different properties (e.g., material, density), different printing images (e.g., a first printing image corresponding to a first printing material and a second printing image corresponding to a second printing material) may be determined.

In 1040, a variable i may be defined as equal to 1. The variable i may be used to represent the sequence number of a printing layer. In some embodiments, the operation 1040 may be implemented by the printing control module 430 of the processing device 140.

In 1050, the printing control module 430 of the processing device 140 may compare the variable i with a value K. If the variable i is equal to or smaller than K, operation 1060 may be performed; and if i is greater than K, process 1000 may end. In some embodiments, the value K may represent the total amount of printing layers to be printed.

In 1060, an $i^{th}$ printing layer of the plurality of printing layers may be printed. In some embodiments, the operation 1060 may be implemented by the 3D printing device 110. More descriptions regarding the process of printing an $i^{th}$ printing layer may be found elsewhere in the present disclosure. See, e.g., FIG. 11 and relevant descriptions thereof.

In 1070, the variable i may be updated by adding value 1. In some embodiments, the operation 1070 may be implemented by the printing control module 430 of the processing device 140.

It should be noted that the above description of the process of scanning an object is merely provided for the purposes of illustration, and not intended to limit the scope of the present disclosure. For persons having ordinary skills in the art, multiple variations and modifications may be made under the teachings of the present disclosure. For example, the process 1000 may further include an operation of detecting status of the one or more microLED emitters in the microLED panel. As another example, the process 1000 may further include an operation of outputting the plurality of printing layers for confirmation by a user. Such variations and modifications do not depart from the scope of the present disclosure.

Figure 11:
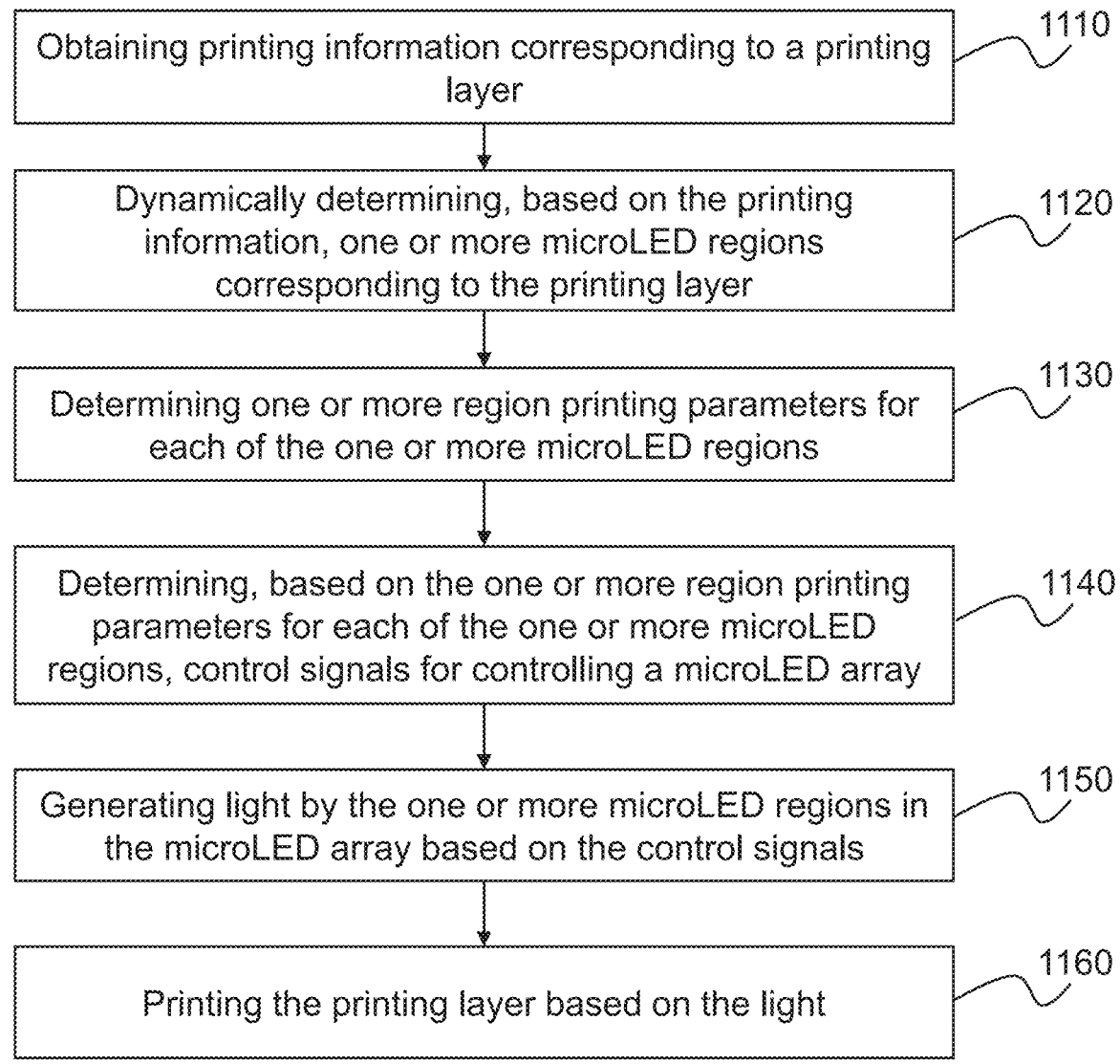
FIG. 11 is a flowchart of an exemplary process of printing a printing layer according to some embodiments of the present disclosure.

FIG. 11 is a flowchart of an exemplary process of printing a printing layer according to some embodiments of the present disclosure. In some embodiments, one or more operations of the process 1100 illustrated in FIG. 11 may be implemented in the 3D printing system 100 illustrated in FIG. 1. For example, the process 1100 illustrated in FIG. 11 may be stored in the storage device 150 in the form of instructions, and invoked and/or executed by the processing device 140 (e.g., the processor of a computing device). As another example, a portion of the process 1100 may be implemented on the 3D printing device 110.

In 1110, printing information corresponding to a printing layer may be obtained. In some embodiments, the operation 1110 may be implemented by the print control module 430 of the processing device 140. The printing information may include image information (e.g., a tiled image), thickness information, and/or printing material information corresponding to the printing layer. In some embodiments, the printing information may further include information of the microLED array which can be used to produce light for the printing layer.

In 1120, one or more microLED regions corresponding to the printing layer may be dynamically determined based on the printing information. In some embodiments, the operation 1120 may be implemented by the print control module 430 of the processing device 140. The one or more microLED regions may have any shape, for example, a square, a rectangle, a circle, and/or an irregular shape. Each of the one or more microLED regions may include one or more microLED emitters. The dynamical determination of the one or more LED regions corresponding to the printing layer may include determining the same or different microLED regions for a printing layer and/or determining the same or different microLED regions for different printing layers. In some embodiments, the dynamical determination of the one or more LED regions may be adapted to print an object having any particular structure (e.g., a strip object, an irregular shape object) with minimal printing space waste.

Figure 18:
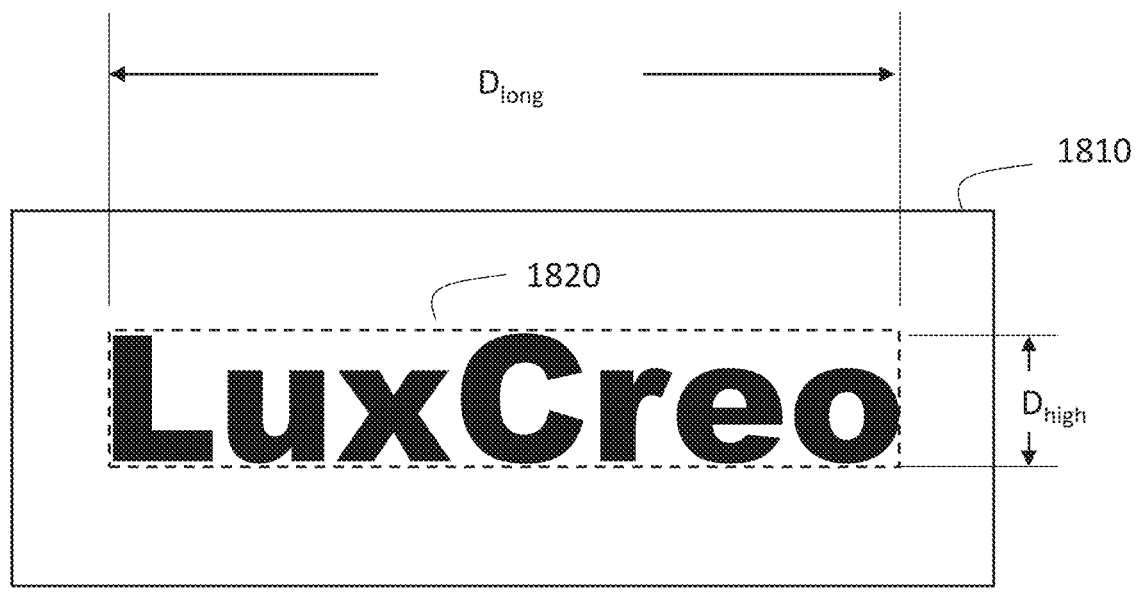
FIG. 18 is a schematic diagram illustrating an exemplary microLED region for a printing layer according to some embodiments of the present disclosure.

In some embodiments, the one or more microLED regions (e.g., the microLED region 1820) may have a shape of a rectangle with a specific aspect ratio (e.g., $D_{long}/D_{high}$) as shown in FIG. 18. The aspect ratio of the microLED region may be dynamically adjusted according to printing requirements. For example, in printing a strip object, one or more microLED regions having a shape of rectangle may be determined, and the aspect ratio of the one or more microLED regions may be dynamically set according to the shape and/or size of the strip object. For example, the aspect ratio of the one or more microLED regions may be 1.1, 2.0, 3.0, 4.0, 5.0, 10.0, or the like. In some embodiments, the one or more microLED regions for a specific printing layer may be combined to form a combined microLED region (i.e., each printing layer corresponds to a combined microLED region) and the aspect ratio of the combined microLED region may also be dynamically adjusted according to printing requirements.

In some embodiments, the counts of microLED emitters included in different microLED regions may be the same or different. A microLED emitter that is driven to emit light may be referred as a regional pixel (RP). Thus, the count of the regional pixels in a microLED region may be equal to or less than the count of the microLED emitters in that microLED region. In a 3D printing process, regional pixels for different microLED regions may be the same or different. Alternatively or additionally, regional pixels in each of the one or more microLED regions may vary layer by layer. That is to say, in printing different printing layers, different microLED emitters in a same microLED region may be used to emit light. In some embodiments, the count of region pixels in a microLED region may be dynamically adjusted by the processing device 140 through, e.g., the microLED array driving circuit 900 described in FIG. 9.

In some embodiments, different microLED regions corresponding to a same printing layer may have a same or different types of microLED emitters. For example, for a printing layer, a first microLED region may be a microLED region with a plurality of RGB emitters, and a second microLED region may be a microLED region with a plurality of UV emitters.

In some embodiments, the one or more microLED regions may be the same or different for different printing layers. In some embodiments, before a determination of the one or more microLED regions, a count of microLED regions, with which sufficient light energy and resolution for a current printing layer may be provided, may be determined. The counts of the one or more LED regions corresponding to different printing layers may be the same or different. In some embodiments, when a printing process for the current printing layer is completed, the processing device 140 may determine a new count of microLED regions of a next printing layer in accordance with actual requirements.

In 1130, one or more region printing parameters may be determined for each of the one or more microLED regions. In some embodiments, the operation 1130 may be implemented by the print control module 430 of the processing device 140. The one or more region printing parameters may include a count of actually used microLED emitters in each microLED region, locations of actually used microLED emitters in each microLED region, parameters corresponding to each microLED emitter in each microLED region, such as display status, intensity, exposure time, wavelength, or modulation mode. In some embodiments, the one or more region printing parameters corresponding to different microLED regions may be individually and independently controlled and changed. In such a fashion, different intensity profiles (e.g., radiation patterns) may be created in order to offer different regional effects.

In 1140, control signals for controlling a microLED array may be determined based on the one or more region printing parameters. In some embodiments, the operation 1140 may be implemented by the print control module 430 of the processing device 140. The control signals may be sent to each of the one or more microLED regions in the microLED array, and further to the microLED emitters (e.g., the light irradiating device 530) in each of the one or more microLED regions for generating light. In some embodiments, the control signals may be used to control the microLED array through, for example, the microLED array driving circuit 900 described in FIG. 9.

In 1150, light may be generated by the one or more microLED regions in the microLED array based on the control signals.

In some embodiments, different microLED regions corresponding to a printing layer may output the same or different printing resolutions. In some alternative embodiments, a particular microLED region may include the same or different printing resolution for different printing layers. As described herein, the printing resolution of a microLED region may be determined by the microLED emitters actually driven to emit light (which are also referred to as the regional pixels) and a size of the microLED region. Specifically, the printing resolution of the microLED region may be proportional to the count of the regional pixels in the microLED region, but inversely proportional to the area of the microLED region. For a particular microLED region, the count of the microLED emitters may be a fixed value, but which microLED emitter to emit light may be individually and independently controlled. That is to say, the count of the regional pixels (i.e., the microLED emitters actually driven to emit light) of each microLED region may not be constant and can be independently controlled. In some embodiments, the regional pixels may vary according to instructions from the processing device 140 and the printing resolution requirements. The printing resolution of a microLED region may be any value not exceeding an innate microLED resolution of the microLED region, which can be achieved by lighting up all the microLED emitters in the microLED array. More descriptions regarding the regional pixel and resolution may be found elsewhere in the present disclosure. See, e.g., FIG. 6 and relevant descriptions thereof.

In some embodiments, the wavelengths of light generated by each microLED region may be individually and independently controlled. For example, a particular microLED region may generate light with the same or different wavelengths for different printing layers. As another example, different microLED regions corresponding to a same printing layer may also generate light with the same or different wavelengths. Such individual and independent wavelength control may be used to cure different polymerizable materials in the same vat (e.g., the material vat 510) and/or inhibit polymerization in designated areas and thicknesses. In some embodiments, such individual and independent wavelength control may be used to cure various molecular groups on the same molecular chain.

In such a way, one may print 3D objects with various properties. For example, a large 3D object may have both rigid and flexible parts through a single printing process utilizing three wavelengths. A first wavelength and a second wavelength may be used to polymerize materials with different properties (e.g., the first wavelength for polymerizing a rigid part and the second wavelength for polymerizing a flexible part). A third wavelength may be applied to photoinhibitor. The third wavelength may inhibit polymerization at a surface of a projection window, thus creating a dead zone (non-stick area at the projection window surface) with a dead zone thickness defined by a light intensity of each microLED emitter with the third wavelength tuned to the photoinhibitor chemistry. In some embodiments, a microLED region's wavelength tuned to photoinhibitor chemistry scales uniformly with the microLED size and provides a basis for small to large dead zone areas. Dead zones volume may easily be controlled with light intensity control of the microLED region across the build area (e.g., corresponding to parts of the 3D printed object 560. For example, the dead zone may take a uniform or non-uniform height based on the light intensity of the photoinhibitor wavelength emitted by each microLED region. In some embodiments, controlling the thickness may enable large build areas with high viscosity resins to flow more easily to increase the potential printing speed or unique internal or surface effects. In some embodiments, the above three wavelengths may be generated by a single microLED region, or two or more microLED regions, respectively.

In some embodiments, during photopolymerization of one layer (L1), a certain number (N1) of microLED regions may be created. Within each microLED region, only a certain number of microLED emitters may display "on" status while the others may display "off" status. In the photopolymerization process of a next layer (L2), another number (N2) of microLED regions may be created. N1 may be equal or not equal to N2. During the polymerization process of layer L2, within each microLED region, the microLED emitters that displayed "on" status in printing layer L1 may display "on" or "off" status.

In some embodiments, the display status of each microLED emitter may be dynamically controlled by the processing device 140 in such a fashion that the microLED emitters in a microLED region or in the microLED array display "on" status alternately (e.g., through the rotating or shifting mechanism described in connection with FIGS. 8A and 8B). In some embodiments, during the entire photopolymerization process, each microLED emitter may have an equal time of displaying "on" or "off" status. For example, during the entire photopolymerization process, a total time of a microLED emitter displaying "on" status may be the same or substantially same to that of another microLED emitter. The total time of the microLED emitter displaying "off" status may also be the same or substantially same to that of the another microLED emitter. In such a fashion, each microLED emitter has equal opportunity to cool off while other microLED emitters are displaying "on" status to satisfy the light energy and resolution requirement of the photopolymerization of each printing layer. As a result, the entire microLED array may have a longer lifetime for usage.

In 1160, the printing layer may be printed based on the light. In some embodiments, the operation 1130 may be implemented by the 3D printing device 110.

It should be noted that the above description of the process of printing a printing layer is merely provided for the purposes of illustration, and not intended to limit the scope of the present disclosure. For persons having ordinary skills in the art, multiple variations and modifications may be made under the teachings of the present disclosure. For example, the process 1060 may further include an operation of determining malfunctioning microLED emitters in a microLED region or in the entire microLED array. As another example, the process 1060 may further include an operation of collimating the light beam generated by the microLED array. Such variations and modifications do not depart from the scope of the present disclosure.

FIGS. 12A-12D are schematic diagrams illustrating exemplary pixel configurations (or light color configuration) according to some embodiments of the present disclosure.

As shown in FIGS. 12A-12D, one or more microLED emitters in a microLED region may be denoted as one or more pixels and arranged in a specific format (e.g., chessboard format). That is to say, each microLED region may include one or more pixels and the one or more pixels may be clustered into one or more pixel groups (e.g., 1215, 1225, 1235, 1245). Each of the pixel groups 1215, 1225, 1235, and 1245 may include more than one pixel corresponding to more than one microLED emitter. The more than one microLED emitter may have the shape of, e.g., a circle, a strip, a square, a rectangle, or the like. The more than one microLED emitter in a specific pixel group may have the same or different colors. In other words, the more than one microLED emitter in the specific pixel group may be configured to generate light with the same or different wavelengths. In some embodiments, at least part of one or more pixel groups may form a microLED region as described elsewhere in the disclosure.

Figure 12A:
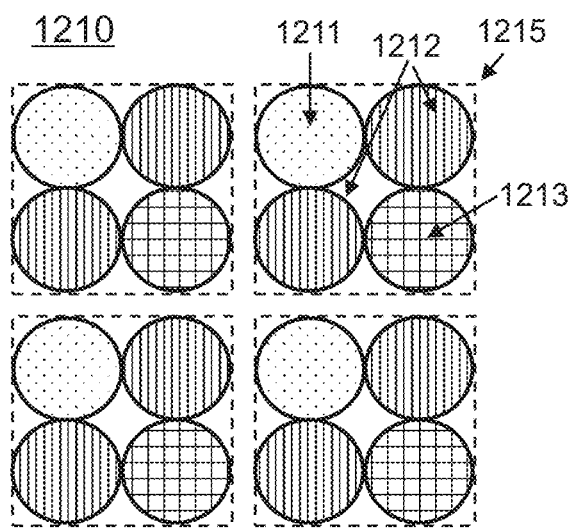
FIGS. 12A-12D are schematic diagrams illustrating exemplary pixel configurations according to some embodiments of the present disclosure.
Figure 12B:
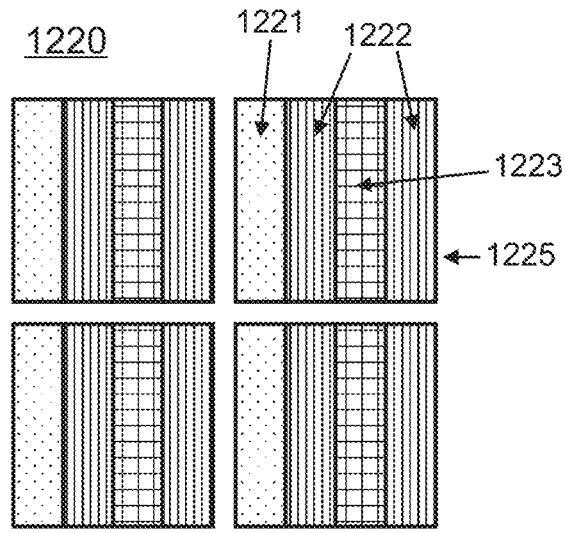
Figure 12C:
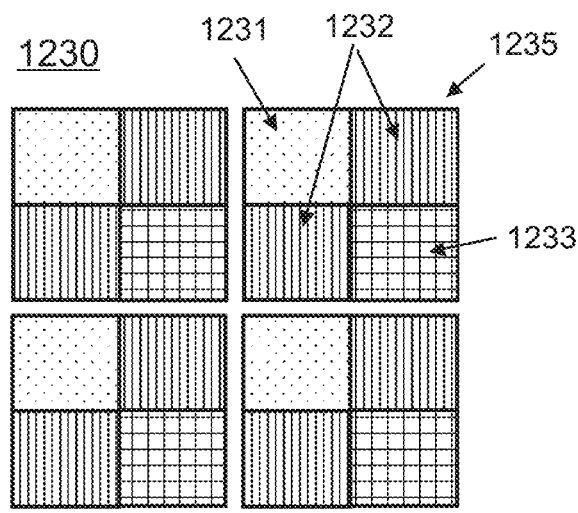

For illustration purposes, microLED regions of pixel configurations 1210,1220, and 1230 may be configured to generate ultraviolet light. The wavelength of the ultraviolet light may be in any range, for example, 100 nm 405 nm. As shown in FIG. 12A, pixels in a pixel group are arranged in a matrix form. Pixel 1211 may correspond to an Ultraviolet-B microLED emitter, pixel 1212 may correspond to an Ultraviolet-A microLED emitter, and pixel 1213 may correspond to an Ultraviolet-C microLED emitter. In some embodiments, the Ultraviolet-A microLED emitter may generate light with a wavelength between 100 nm~280 nm, the Ultraviolet-B microLED emitter may generate light with a wavelength between 280 nm~315 nm, and the Ultraviolet-C microLED emitter may generate light with a wavelength between 315 nm~405 nm. As shown in FIG. 12B, pixel strip 1221 may correspond to an Ultraviolet-B microLED emitter, pixel strip 1222 may correspond to an Ultraviolet-A microLED emitter, and pixel strip 1223 may correspond to an Ultraviolet-C microLED emitter. As shown in FIG. 12C, pixel 1231 may correspond to an Ultraviolet-B microLED emitter, pixel 1232 may correspond to an Ultra-violet-A microLED emitter, and pixel 1233 may correspond to an Ultraviolet-C microLED emitter.

Figure 12D:
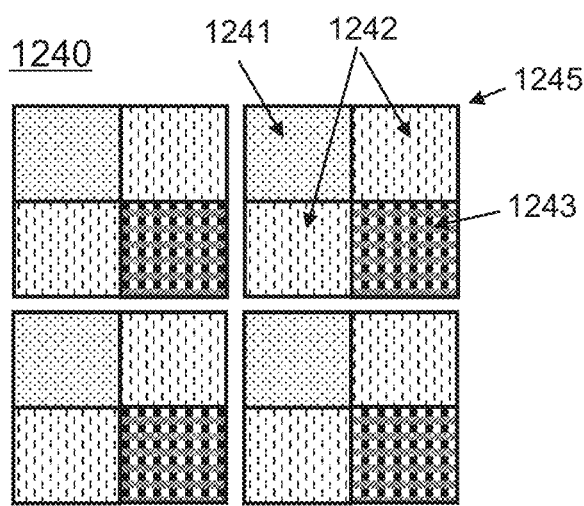

MicroLED regions of pixel configuration 1240 may be configured to generate visible light. The wavelength of the visible light may be in any range, for example, 405 nm~700 nm. As shown in FIG. 12D, pixel 1241 may correspond to a red microLED emitter, pixel 1242 may correspond to a green microLED emitter, and pixel 1243 may correspond to a blue microLED emitter. It shall be noted that the arrangement of the pixels in different colors, e.g., the count of pixels in a specific color, the spatial distribution of pixels in different colors, is not limited in the disclosure, and may be adjusted according to actually needs.

Figure 12E:
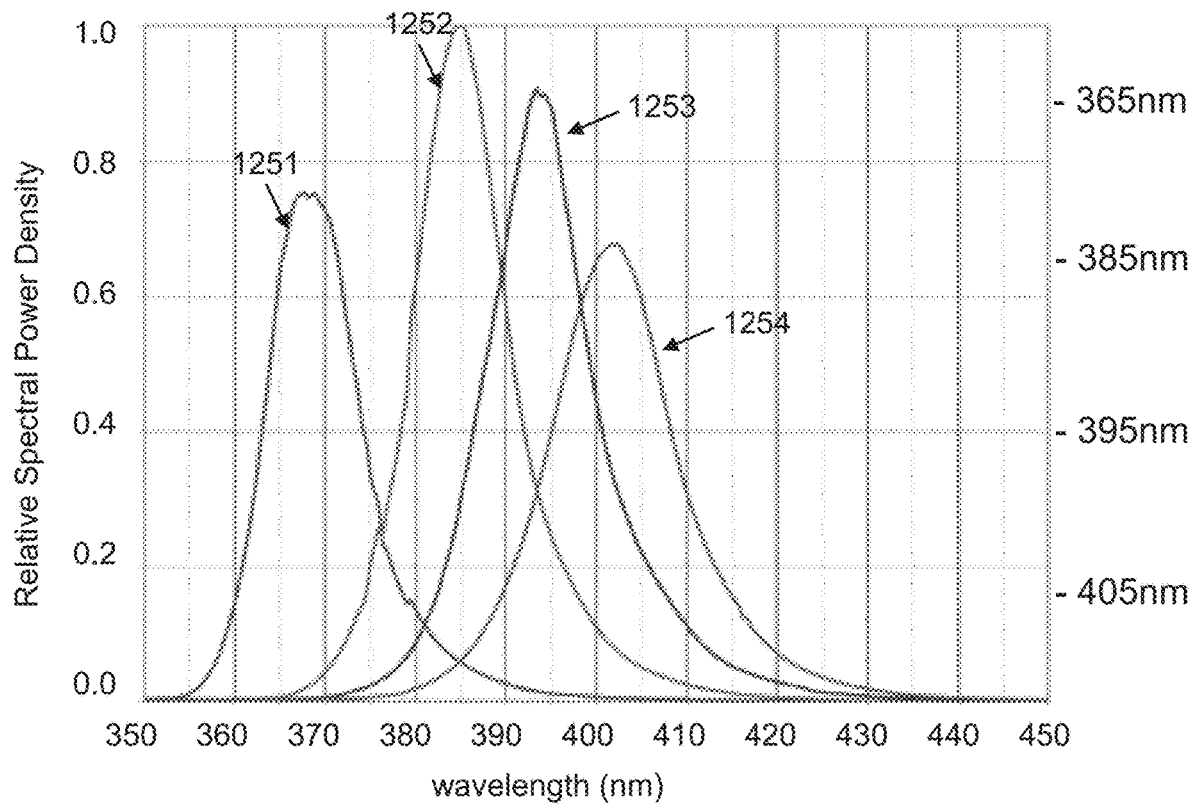
FIG. 12E is a schematic diagram illustrating an exemplary relative spectral power density according to some embodiments of the present disclosure.

FIG. 12E is a schematic diagram illustrating an exemplary relative spectral power density according to some embodiments of the present disclosure. As shown in FIG. 12E, the horizontal x-axis represents a wavelength (in nm) of light, and the vertical y-axis represents a relative spectral power density. Curves 1251, 1252, 1253, and 1254 indicates the distributions of a relative spectral power density of the light generated by different UV microLED emitters (e.g., the Ultraviolet-A microLED emitter, Ultraviolet-B microLED emitter, Ultraviolet-C microLED emitter). Specifically, the curve 1251 has a peak wavelength at 365 nm at which the relative spectral power density reaches the maximum. The curve 1252 has a peak wavelength at 385 nm, the curve 1253 has a peak wavelength at 395 nm, and the curve 1254 has a peak wavelength at 405 nm.

Figure 13:
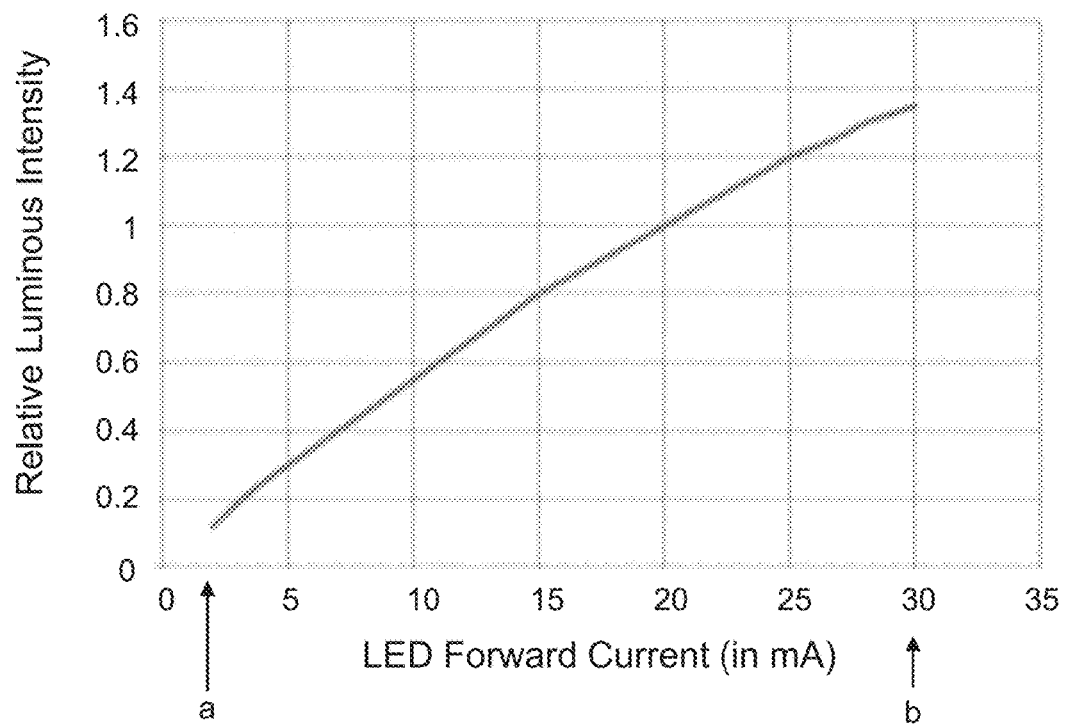
FIG. 13 is a schematic diagram illustrating an exemplary curve representing the relative luminous intensity of a microLED according to some embodiments of the present disclosure.

FIG. 13 is a schematic diagram illustrating an exemplary curve representing the relative luminous intensity of a microLED according to some embodiments of the present disclosure.

As shown in FIG. 13, the horizontal x-axis represents an LED forward current (in mA), and the vertical y-axis represents a relative luminous intensity of light. The interval (a, b) may indicate a range for a microLED emitter where the luminous intensity changes linearly with respect to the forward current. In the interval (a, b), the luminous intensity of the microLED emitter may be controlled by adjusting the forward current through the microLED emitter. In some embodiments, for a microLED region with a plurality of microLED emitters, by controlling the luminous intensity of different microLED emitters at different locations, a desired intensity distribution of the microLED region may be controlled, that is to say, a spatial control of light produced by a microLED region or a microLED array may be achieved.

Figure 14:
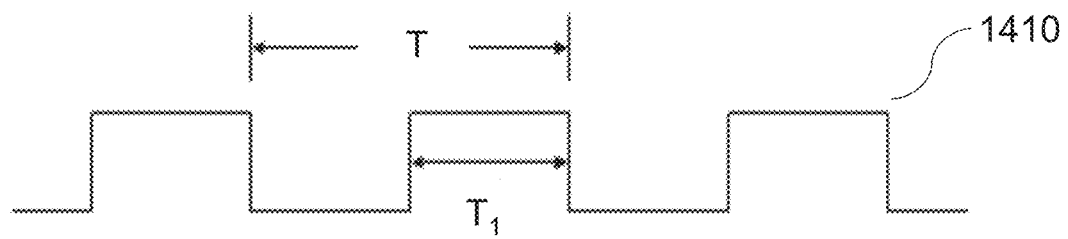
FIG. 14 is a schematic diagram illustrating an exemplary frequency control according to some embodiments of the present disclosure.

FIG. 14 is a schematic diagram illustrating an exemplary frequency control according to some embodiments of the present disclosure.

As shown in FIG. 14, a square wave signal 1410 may be employed to perform a PWM control of an irradiating device (e.g., a microLED emitter). For example, the irradiating device may be driven by the square wave signal 1410 at a fixed frequency f (period T=1/f) to emit light. The brightness (or intensity) of the output light of the irradiating device may depend on the duration $T_1$ of the square wave in one period. Specifically, the brightness (or intensity) of the output light of the irradiating device may be determined based on a duty cycle, i.e., $T_1/(T-T_1)$ during each period. The shorter the duration $T_1$ of the square wave in one period, the dimmer the light emitted by the microLED emitter. In some embodiments, for a particular microLED region with one or more microLED emitters, the duty cycle for each of the one or more microLED emitters may be individually and independently adjusted to achieve a desired intensity of light provided by the microLED region.

Figure 15:
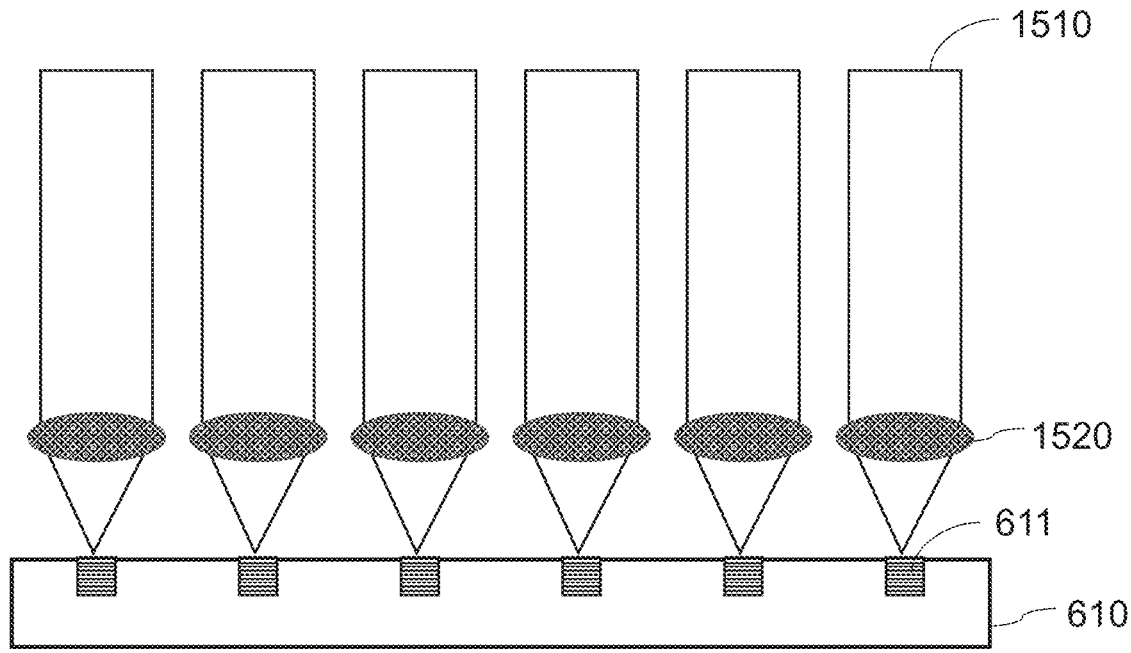
FIGS. 15-17 are schematic diagrams illustrating exemplary optical elements for collimating a light beam according to some embodiments of the present disclosure.

FIG. 15 is a schematic diagram illustrating exemplary optical elements for collimating a light beam according to some embodiments of the present disclosure. A lens array may be employed to generate parallel light 1510. The lens array may include one or more lens 1520 which may be placed at positions corresponding to a microLED array for performing a pixel-by-pixel light collimation, that is, the light emitted by each microLED emitter may be collimated by a respective lens in the lens array. In some alternative embodiments, two or more microLED emitters may use a same lens in the lens array for collimation.

The lens 1520 may include a convex lens. A traditional convex lens may work by taking incoming parallel light rays on one side, and refracting them on an opposite side, causing the light to converge into a single point. This point may be known as a focal point, a distance to which is a focal length. Conversely, light emitted from a microLED emitter 611, which can be roughly regarded as a point source, through the lens 1520 may be collimated to form parallel rays.

Figure 16:
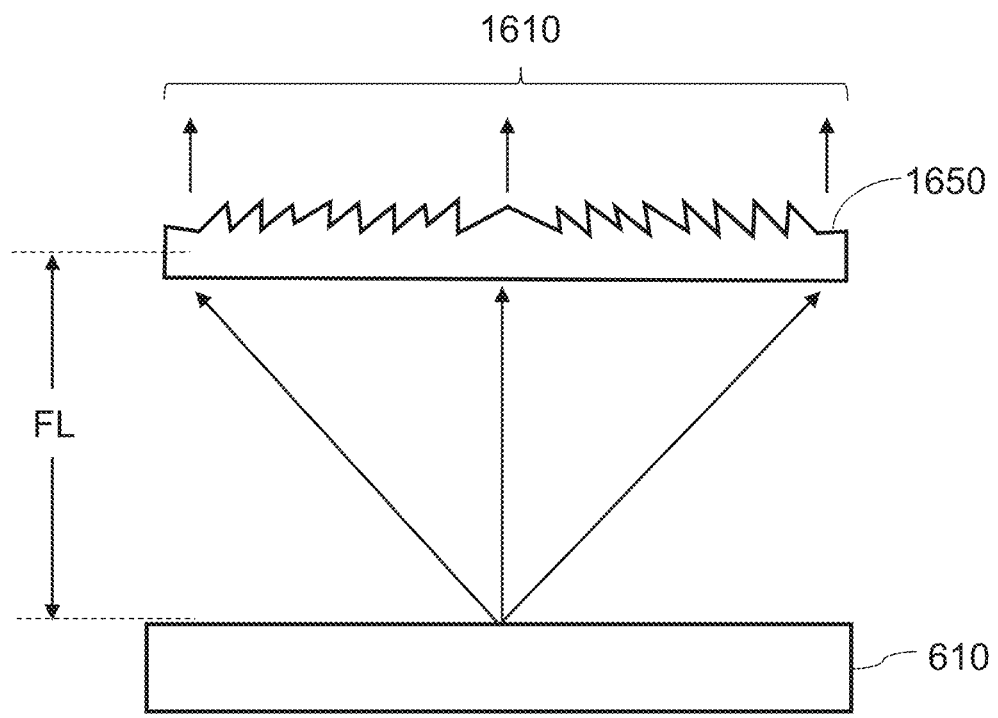

FIG. 16 is a schematic diagram illustrating exemplary optical element for collimating a light beam according to some embodiments of the present disclosure.

The microLED panel 610 may shoot light to a Fresnel lens 1650 to generate parallel light 1610. The Fresnel lens 1650 may include a series of concentric rings. Each ring may have a slightly different cross-section curvature corresponding to a curvature of a convex lens of equal diameter. A microLED emitter may be placed at a focal point of the Fresnel Lens 1650, and light emitted by the microLED emitter may be collimated to be the parallel light 1610.

Figure 17:
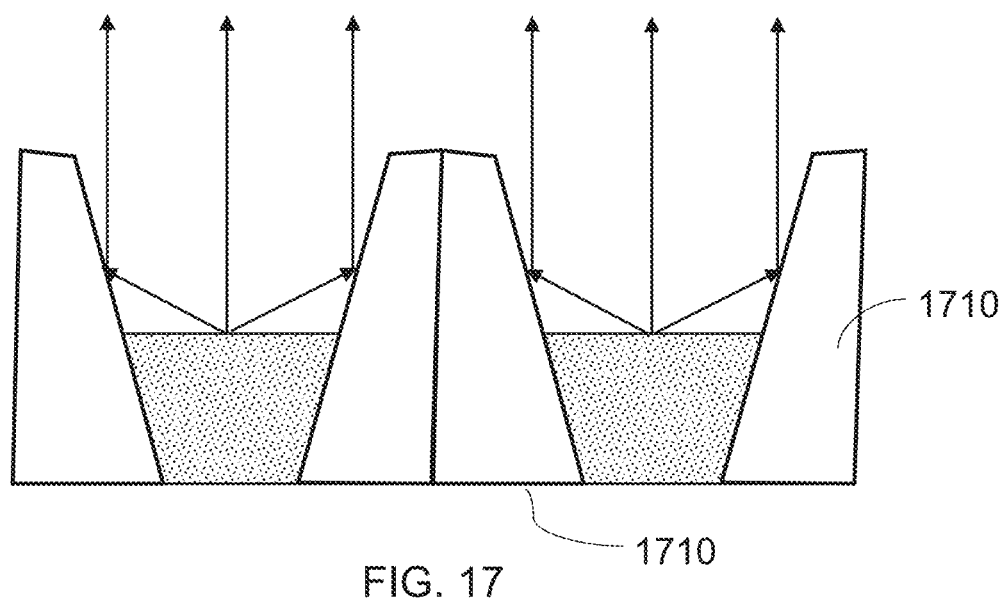

FIG. 17 is a schematic diagram illustrating exemplary optical element for collimating a light beam according to some embodiments of the present disclosure.

In some embodiments, light emitted by a microLED emitter may be collimated by a parabolic mirror. A perfect parabolic mirror may bring parallel rays to focus at a single point. Conversely, a point source (e.g., the microLED emitter) at the focus point of the parabolic mirror may produce a beam of collimated light.

One or more rib structure 1710 may be employed to generate a collimated light beam base on the same principle of the parabolic mirror. The one or more rib structure 1710 may form a parabolic structure and a microLED emitter may be placed at a focal point of the parabolic structure. Then light emitted by the microLED emitter may be shaped into parallel light.

FIG. 18 is a schematic diagram illustrating an exemplary microLED region for a printing layer according to some embodiments of the present disclosure. For printing a specific layer of an object, a microLED region 1820 may be determined in the microLED array 1810 (also referred to as microLED panel 1810). The microLED region 1820 may include one or more microLED emitters. MicroLED emitters corresponding to a pattern "LuxCreo" may be driven to emit light, while other microLED emitters may display "off" status. An aspect ratio of the microLED region 1820 may be $D_{long}/D_{high}$, which may be determined based on the pattern "LuxCreo".

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as an "apparatus," "device," "equipment," "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A photopolymerization 3D printing system comprising:
a processing device configured to determine one or more printing layers of an object;
a micro light emitting diode (microLED) array configured to generate light for each of the one or more printing layers, wherein to generate the light for each of the one or more printing layers, the processing device is configured to:
dynamically determine one or more microLED regions in the microLED array, each of the one or more microLED regions including one or more individually addressable microLED emitters,
determine one or more region printing parameters for each of the one or more microLED regions; and
determine one or more control signals for the one or more individually addressable microLED emitters included in each of the one or more microLED regions based on the one or more region printing parameters, wherein position of at least one of the one or more individually addressable microLED emitter is adjustable; and
a printing component configured to print the one or more printing layers.

2. The system of claim 1, wherein a pixel pitch of the microLED array is smaller than 50 µm.

3. The system of claim 1, wherein the microLED array are arranged on one or more microLED sub-panels, and the one or more microLED sub-panels are rotatable with respect to each other.

4. The system of claim 1, wherein to dynamically determine one or more microLED regions in the microLED array, the processing device is configured to:
determine a first microLED region for a first printing layer; and
determine a second microLED region for a second printing layer, wherein the first microLED region is different from the second microLED region.

5. The system of claim 1, wherein different printing layers have different counts of microLED regions.

6. The system of claim 1, wherein a third microLED region is determined for both of a third printing layer and a fourth printing layer, wherein:
the third microLED region generates first light with a first wavelength for the third printing layer;
the third microLED region generates second light with a second wavelength for the fourth printing layer; and
the first wavelength is different from the second wavelength.

7. The system of claim 1, wherein the one or more microLED regions include different microLED regions, and the different microLED regions have different counts of microLED emitters.

8. The system of claim 1, wherein the one or more control signals are configured to control at least one of a display status, an exposure time, a wavelength, or a modulation mode of the one or more individually addressable microLED emitters included in each of the one or more microLED regions.

9. The system of claim 1 further comprising:
an optical element for collimating a light beam produced by the one or more microLED regions.

10. A method for photopolymerization 3D printing comprising:
determining one or more printing layers of an object;
for each of the one or more printing layers,
dynamically determining one or more microLED regions in a microLED array, each of the one or more microLED regions includes one or more individually addressable microLED emitters;
determining one or more region printing parameters for each of the one or more microLED regions; and
determining one or more control signals for the one or more individually addressable microLED emitters included in each of the one or more microLED regions based on the one or more region printing parameters, wherein position of at least one of the one or more individually addressable microLED emitter is adjustable;
generating light based on the one or more control signals; and printing the one or more printing layers.

11. The method of claim 10, wherein a pixel pitch of the microLED array is smaller than 50 μm.

12. The method of claim 10, wherein the microLED array are arranged on one or more microLED sub-panels, and the one or more microLED sub-panels are rotatable with respect to each other.

13. The method of claim 10, wherein the dynamically determining one or more microLED regions in a microLED array comprises:
determining a first microLED region for a first printing layer; and
determining a second microLED region for a second printing layer, wherein the first microLED region is different from the second microLED region.

14. The method of claim 10, wherein different printing layers have different counts of microLED regions.

15. The method of claim 10, wherein a third microLED region is determined for both of a third printing layer and a fourth printing layer, wherein:
the third microLED region generates first light with a first wavelength for the third printing layer;
the third microLED region generates second light with a second wavelength for the fourth printing layer; and
the first wavelength is different from the second wavelength.

16. The method of claim 10, wherein the one or more microLED regions include different microLED regions, and the different microLED regions have different counts of microLED emitters.

17. The method of claim 10, wherein the one or more control signals are configured to control at least one of a display status, an exposure time, a wavelength, or a modulation mode of the one or more individually addressable microLED emitters included in each of the one or more microLED regions.

18. The method of claim 10 further comprising:
collimating a light beam produced by the one or more microLED regions.

* * * * *

UNITED STATES PATENT AND TRADEMARK OFFICE
CERTIFICATE OF CORRECTION

PATENT NO. : 12,220,868 B2
APPLICATION NO. : 17/644333
DATED : February 11, 2025
INVENTOR(S) : Michael Robert Strohecker et al.

Page 1 of 1

It is certified that error appears in the above-identified patent and that said Letters Patent is hereby corrected as shown below:

On the Title Page

In the Related U.S. Application Data
Item (63), "Continuation of application No. PCT/CN2020/095964, filed on Jun. 12, 2020" should read
--Continuation of application No. PCT/CN2020/095964, filed on Jun. 12, 2020, which claims priority to U.S. Provisional Application No. 62/862,440, filed on Jun. 17, 2019--

Signed and Sealed this
Eighteenth Day of March, 2025

Coke Morgan Stewart
*Acting Director of the United States Patent and Trademark Office*